US012485049B2

(12) United States Patent
Ko et al.

(10) Patent No.: US 12,485,049 B2
(45) Date of Patent: Dec. 2, 2025

(54) MULTI-FUNCTIONAL TRANSFER ROBOT APPARATUS

(71) Applicants: Young Ji Ko, Seoul (KR); Jung Soo Ko, Seoul (KR); Dae Yong Ko, Seoul (KR)

(72) Inventors: Young Ji Ko, Seoul (KR); Jung Soo Ko, Seoul (KR); Dae Yong Ko, Seoul (KR)

(73) Assignees: Young Ji Ko, Seoul (KR); Jung Soo Ko, Seoul (KR); Dae Yong Ko, Seoul (KR)

( * ) Notice: Subject to any disclaimer, the term of this patent is extended or adjusted under 35 U.S.C. 154(b) by 385 days.

(21) Appl. No.: 18/003,907

(22) PCT Filed: Jun. 29, 2021

(86) PCT No.: PCT/KR2021/008170
§ 371 (c)(1),
(2) Date: Dec. 29, 2022

(87) PCT Pub. No.: WO2022/005161
PCT Pub. Date: Jan. 6, 2022

(65) Prior Publication Data

US 2023/0263677 A1 Aug. 24, 2023

(30) Foreign Application Priority Data

Jun. 30, 2020 (KR) ........................ 10-2020-0080612

(51) Int. Cl.
*A61G 7/02* (2006.01)
*A61G 7/047* (2006.01)
*A61G 7/05* (2006.01)

(52) U.S. Cl.
CPC ............... *A61G 7/02* (2013.01); *A61G 7/047* (2013.01); *A61G 7/0507* (2013.01); *A61G 2203/10* (2013.01)

(58) Field of Classification Search
CPC ..... A61G 7/1032; A61G 7/1034; A61G 7/012
See application file for complete search history.

(56) References Cited

U.S. PATENT DOCUMENTS 5,101,519 A * 4/1992 Yamamoto ........... A61G 7/1084 5/942
2009/0071415 A1* 3/2009 Jehn ......................... A61D 3/00 119/753

(Continued)

FOREIGN PATENT DOCUMENTS

JP 5-305111 A 11/1993
JP 7-213561 A 8/1995

(Continued)

OTHER PUBLICATIONS

International Search Report for PCT/KR2021/008170 by Korean Intellectual Property Office dated Oct. 13, 2021.

*Primary Examiner* — Adam C Ortiz
(74) *Attorney, Agent, or Firm* — BROADVIEW IP LAW, PC

(57) ABSTRACT

The present invention may autonomously execute: a shift mode and a transfer mode in which an object can be shifted or moved without changing the lying state, and the object can be autonomously transferred or carried to certain places and is then returned to the original point; a toilet assistance mode in which a toilet is autonomously searched for to assist a user in using toilet; a bathing assistance mode in which a bathing device or a bathroom is autonomously searched for to assist a user in bathing. The present invention relates to a transfer robot apparatus which employs the concept of a robot and is configured to perform other functions as well as (Continued)

the functions of shift and transfer and, by using technologies such as electronic control and IT, autonomously perform various functions instead of depending on only human power.

10 Claims, 47 Drawing Sheets

(56) References Cited

U.S. PATENT DOCUMENTS

| | | | | |
|---|---|---|---|---|
| 2010/0083441 | A1* | 4/2010 | Ishida | A61G 7/002 5/604 |
| 2011/0162143 | A1* | 7/2011 | Byun | A61G 7/0005 5/604 |
| 2014/0068862 | A1* | 3/2014 | Al-Jafar | A61G 7/02 5/605 |
| 2014/0283297 | A1* | 9/2014 | White | A61G 7/1032 5/81.1 C |
| 2021/0121346 | A1* | 4/2021 | Zhou | A61G 7/1076 |

FOREIGN PATENT DOCUMENTS

| | | | | |
|---|---|---|---|---|
| JP | H07213561 | A | * | 8/1995 |
| JP | 2002-526200 | A | | 8/2002 |
| KR | 10-0292663 | B1 | | 6/2001 |
| KR | 10-2012-0078544 | A | | 7/2012 |
| KR | 10-1394896 | B1 | | 5/2014 |
| KR | 10-2018-0010626 | A | | 1/2018 |
| KR | 20180010626 | A | * | 1/2018 |
| KR | 10-1887204 | B1 | | 8/2018 |

* cited by examiner (NB) OPR: OPERATION
COND: CONDITION

MULTI-FUNCTIONAL TRANSFER ROBOT APPARATUS

CROSS-REFERENCE TO RELATED APPLICATIONS

This application is a National Phase Entry Application of PCT Application No. PCT/KR2021/008170 filed on Jun. 29, 2021, which claims priority to Korean Patent Application No. 10-2020-0080612 filed on Jun. 30, 2020, in Korean Intellectual Property Office, the entire contents of which are hereby incorporated by reference in its entirety.

TECHNICAL FIELD

The present invention relates to mechatronics, automatic control, artificial intelligence, autonomous driving, information and communication, or robot technology for shifting and transferring a less mobile person such as a patient, a disabled person, an elderly person, or an infant, or an object such as an animal or a thing.

BACKGROUND ART

Various types of transfer apparatuses for moving animals or objects as well as less mobile persons such as patients, disabled persons, elderly persons, or infants are known.

An example of a patient transfer apparatus is disclosed in Korean Patent Registration No. 10-1394896 (published on May 27, 2014). In Korean Patent Registration No. 10-1394896, the patient transfer apparatus includes a body on which an upper body of a patient leans, a first clamp rotatably provided at one side of the body to support the upper body of the patient, a second clamp which supports a lower body of the patient, a support which adjusts a height of the body, and a transfer plate connected to the support to rotate and move. In Korean Patent Registration No. 10-1394896, it is possible to quickly shift a patient and easily maintain a boarding state without change from the most comfortable position, thereby minimizing stress during boarding and moving.

However, most conventional transfer apparatuses do not have a function of transferring a patient or the like on a bed to a transfer device (a function of transferring, picking up, or shifting the patient) without a change in a state in which the user lies on the bed. In addition, since the conventional transfer apparatus has only a function in which a caregiver or protector shifts a patient and pushes the transfer apparatus to a destination himself/herself, the conventional transfer apparatus depends only on manpower, and there is a risk of infection with viruses, germs, or bacteria through face-to-face contact with patients. Moreover, there is no transfer apparatus having a communication or cooperation function with an external environment or apparatus. Such problems apply not only to persons such as patients or disabled persons but also to objects such as various animals (for example, dogs, cats, lions, horses, and crocodiles) or objects such as furniture and equipment.

DISCLOSURE

Technical Problem

The present invention is directed to providing a transfer robot apparatus which is capable of, in addition to a simple shift/transfer function of a related art, automatically, conveniently, and safely performing other functions as well as a function of shifting/transferring patients, disabled persons, various animals, and objects in a non-face-to-face manner and adopts a robot concept that utilizes technologies such as an electronic control, artificial intelligence, and information technology (IT) to autonomously perform corresponding functions and perform interaction/communication with external environments or apparatuses without depending only on manpower.

Technical Solution

In order to solve the above problems, there is provided a transfer robot apparatus (hereinafter referred to as a "transfer robot") capable of shifting an object such as a patient, a disabled person, an elderly person, an infant, an animal, or a thing without a change in a lying state, autonomously transferring the transferred object to a destination point (a bathroom, a shower, a lounge, a dining room or refectory, a hospital room, or the like), and returning to the original point. In addition to shift and transfer functions, the transfer robot of the present invention can autonomously perform a defecation assistance function and a bathing assistance function. Here, the "objects" include not only patients, disabled persons, elderly persons, and infants, but also animals such as dogs, cats, wild beasts, and crocodiles, and objects such as furniture and equipment.

According to an embodiment of the present invention, a multi-functional robot apparatus includes an upper plate formed by connecting one or more divided plates in a longitudinal direction, a porous flexible sheet which is included in each divided upper plate and reciprocates in a lateral direction, and a pivot mechanism included between the divided upper plates such that each divided upper plate independently pivots vertically.

The multi-functional transfer robot apparatus may further include a control unit configured to perform an object shift mode, an object transfer mode, a defecation (urination) assistance mode, and a bathing assistance mode. The control unit may autonomously execute object shift/transfer, defecation assistance, and bathing assistance. The multi-functional transfer robot apparatus of the present invention may autonomously perform a shift/transfer mode of shifting an object such as a patient or a disabled person without a change in a lying state, autonomously transferring the shifted object to a bathroom or a shower, and returning to the original point, a defecation assistance mode of autonomously searching for a toilet to assist with defecation, and a bathing assistance function of autonomously searching for a bathing device or a shower to assist with bathing.

The transfer robot apparatus of the present invention may communicate with an external environment, and an autonomous execution unit may autonomously perform functions.

Advantageous Effects

According to the present invention, it is possible to conveniently and easily perform an operation of shifting an object such as a person, an animal, or a thing without a change in a lying posture and transferring the object to the external environment or devices (for example, another bed, a toilet, or a bathing device). In addition, a communication or cooperation function with an external environment or device is provided, thereby allowing various functions such as shift, transfer, defecation assistance, and bathing assistance functions to be performed autonomously. In addition, it is possible to avoid infection with viruses, germs, or bacteria due to face-to-face contact with patients.

MODES OF THE INVENTION

As embodiments of the present invention, a multi-functional transfer robot for performing shift, transfer, defecation assistance, and bathing assistance functions for a user such as a patient, a disabled person, an elderly person, or an infant will be described.

Advantages and features of the present invention and methods of achieving them will become more apparent with reference to embodiments described in detail in conjunction with the accompanying drawings. However, the present invention is not limited to the embodiments described below. The embodiments serve only to complete the disclosure of the present invention and are provided to fully inform those of ordinary skill in the art of the scope of the present invention, and the present invention is defined by the description of the claims.

<Shift and Transfer Functions>

Figure 1:
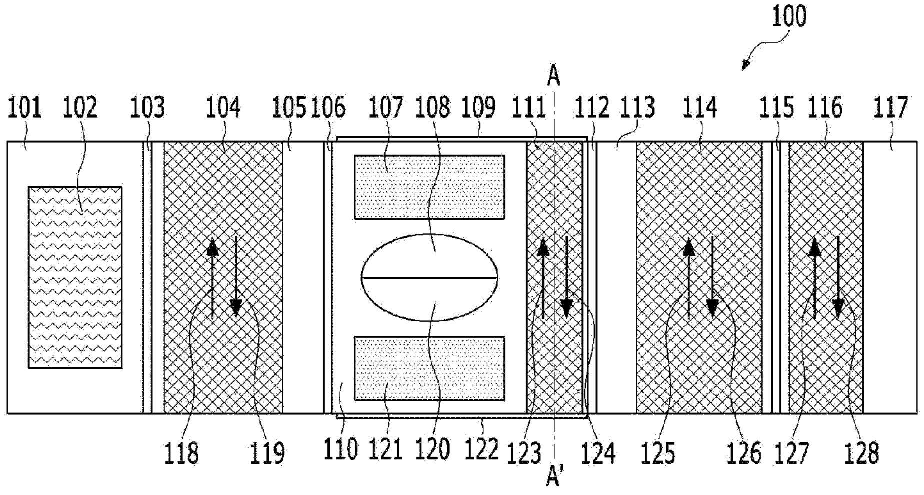
FIG. 1 is a plan view of a transfer robot according to an embodiment of the present invention.
Figure 2:
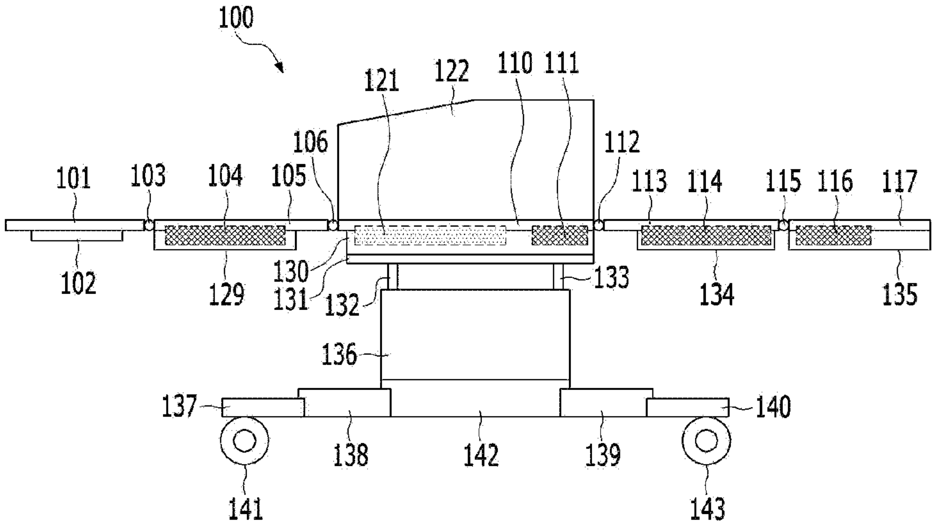
FIG. 2 is a right-side view of the transfer robot according to the embodiment of the present invention.
Figure 3:
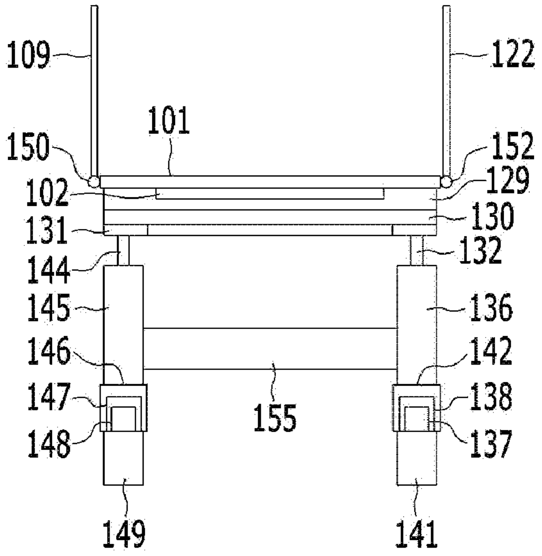
FIG. 3 is a front view of the transfer robot according to the embodiment of the present invention.

FIG. 1 is a plan view of a transfer robot according to an embodiment of the present invention, FIG. 2 is a right-side view, and FIG. 3 is a front view.

Referring to the plan view of FIG. 1, from the left, divided plates that are a first plate 101, a second plate 105, a third plate 110, a fourth plate 113, and a fifth plate 117 are connected to constitute an upper plate. A user lies on the one plate formed of the divided plates and receives services dealing with a meal, transfer, defecation, bathing, etc. In the present embodiment, the user is a patient, a disabled person, an elderly person, or an infant as premised above.

The first plate 101 is a part with which a foot of a user comes in contact. Here, a heating wire 102 is embedded to warm a foot (a heating wire can be installed in other divided upper plates where required in the following description).

The second plate 105 is a part with which a leg of a user comes in contact, and for lateral movement of a user, a porous flexible sheet 104 made of a fiber or a fabric material through which air or water may pass is wound to move in a lateral direction (in an arrow direction) (that is, is installed in the lateral direction of the upper plate in the form of a roll).

The third plate 110 is a part with which a thigh and hip of a user come in contact, and in which air holes 107 and 121 for ventilation are formed, and to this end, an air circulation mechanism for ventilation is installed inside the plate. A porous flexible sheet 111 for lateral movement of a user is also wound on the third plate 110 in the lateral direction. In addition, opening/closing ports 108 and 120, which are electrically or manually operated to allow urine and feces of a user to fall, are formed. The opening/closing ports 108 and 120 may have a structure in which two slide doors are opened or closed in opposite lateral directions, and an opening/closing operation may be performed both in manual mode and in electric mode. In addition, safety handrails 109 and 122 (see FIG. 2) for the safety of a user may be provided at both sides in the lateral direction (a hook for hanging a remote control may be provided on the safety handrail).

The fourth plate 113 is a part with which a back of a user comes in contact, and a porous flexible sheet 114 for lateral movement of a user is also wound thereon in the lateral direction.

The fifth plate 117 is a part with which a head of a user comes in contact, and a porous flexible sheet 116 for lateral movement of a user is also wound thereon in the lateral direction.

The divided upper plates are coupled to be independently pivoted vertically (that is, in a direction in which the divided upper plates protrude from or enter through the paper surface on which FIG. 1 is drawn) by pivot mechanisms 103, 106, 112, and 115. The pivot mechanism may include elements such as an electrically operated pivot shaft and hydraulic cylinder. However, the pivot mechanism may also be provided to be manually operated.

As described above, the upper plate is divided into the first plate 101, the second plate 105, the third plate 110, the fourth plate 113, and the fifth plate 117 so that the upper plate bends according to a situation or for the convenience of a user when the user lies on the upper plate (for example, a shape of the upper plate may be transformed to raise the head and lower the legs for eating or defecation, which will be described below).

The porous flexible sheets 104, 111, 114, and 116 wound on the four divided upper plates in the lateral direction are provided to move in conjunction with each other in an upward direction indicated by arrows 118, 123, 125, and 127 or a downward direction indicated by arrows 119, 124, 126, and 128 in the same direction at almost the same speed.

Here, although the porous flexible sheets are illustrated as being included in all the divided second to fifth plates, in another embodiment, the porous flexible sheets may be installed in one or more divided upper plates requiring the porous flexible sheet among the first to fifth plates without being applied to all the upper plates.

Description will continue with reference to the right-side view of the transfer robot in FIG. 2. The upper plate divided into the first plate 101, the second plate 105, the third plate 110, the fourth plate 113, and the fifth plate 117 and components attached thereto are the same as those described with reference to FIG. 1 (in FIG. 2, all the divided upper plates are spread on one plane). Hydraulic cylinders 132 and 133 operated by an electric motor are provided under the third plate 110 to adjust a height, a left-right (lateral) tilt, and a front-rear (longitudinal) tilt of the upper plate. In addition, wheels 141 and 143 are laterally spaced apart from each other and supported by wheel frames 137, 138, 139, and 140 for supporting the wheels and are driven and steered by an electric motor. The wheel frames 137, 138, 139, and 140 include first extension structures or telescopic mechanisms 137 and 138 and second extension structures or telescopic mechanisms 139 and 140 which are installed in two sets at both end portions of a support 142 for supporting a leg 136 of the transfer robot. The extension structures or telescopic mechanisms are extended and contracted in opposite directions, and such an action is electrically controllable (of course, extension structures or telescopic mechanisms may also be manually operated).

In the front view of FIG. 3, electric hydraulic cylinders 144 and 132 for adjusting a height, a left-right tilt (a height difference between a left side and a right side as shown in FIG. 3), and a front-rear tilt (a height difference between a left side and a right side as shown in FIG. 2) can be seen, supports 142 and 146 for supporting legs 136 and 145 of the transfer robot thereunder can be seen, a leg frame 155 for coupling and supporting the legs 136 and 145 of the transfer robot can be seen, and a pair of wheel frames 137 and 138 or 147 and 148 connected to the legs 136 and 145 and wheels 141 and 149 can be seen. A state in which the safety handrails 109 and 122 at both sides are erected around rotation shafts 150 and 152 can be seen.

Meanwhile, although not shown, when viewed from a side opposite to that shown in FIG. 3, that is, from a rear side, since the leg frame 155 for coupling and supporting the legs 136 and 145 of the transfer robot shown in FIG. 3 is foldable, there is an empty space between the legs 136 and 145. The space is a space into which a toilet is inserted when a defecation assistance function is performed, which will be described blow.

Figure 4:
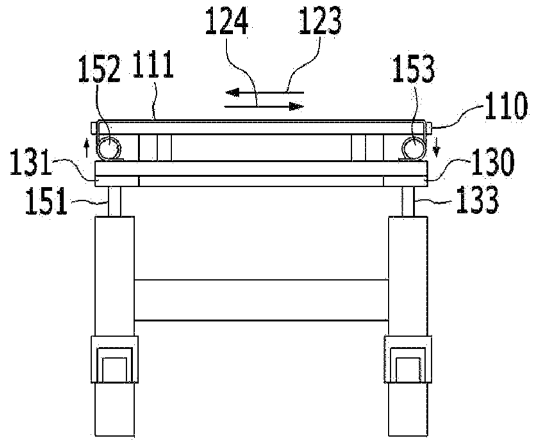
FIG. 4 is a cross-sectional view along line A-A' of FIG. 1.

FIG. 4 is a cross-sectional view along line A-A' of FIG. 1. That is, FIG. 4 is a cross-sectional view of the third plate 110. There are frames 130 and 131 for supporting the third plate 110 which is one of the divided upper plates, and the frames adjust a height, a left-right tilt, and a front-rear tilt through a first hydraulic cylinder 151 and a second hydraulic cylinder 133 driven by an electric motor. Rollers 152 and 153 for moving the porous flexible sheet 111 in the lateral direction are installed on the support frames 130 and 131 of the third plate 110. When the roller 152 and the roller 153 rotate in a right direction indicated by an arrow 124, a user lying on the upper plate is moved in a right lateral direction indicated by the arrow 124 without a change in the lying state, and when the roller 152 and the roller 153 rotate in a left direction indicated by an arrow 123, the user is moved in a left lateral direction indicated by the arrow 123 without a change in the lying state. An operating principle similar to that shown in FIG. 4 is also applied to other divided upper plates, that is, the second plate 105, the fourth plate 113, and the fifth plate 117, on which the porous flexible sheets are wound in the lateral direction.

As described above, since the porous flexible sheet reciprocates in the lateral direction of the upper plate, in order to transfer a user lying on the upper plate, without raising a user or lifting and shifting the user, by several persons, to another bed or transfer apparatus, through lateral movement of the porous flexible sheet, the user can be shifted to another bed or transfer apparatus without a change in the lying state or posture. In this case, if a height of the hydraulic cylinder is adjusted differently to tilt the upper plate toward another bed or transfer apparatus, a shift operation will be easier (which will be described below).

The divided upper plates are bent and transformed into various shapes according to a situation of a user by the pivot mechanisms for connecting the divided upper plates and the hydraulic cylinders 151 and 133 for adjusting a height, a left-right tilt, and a front-rear tilt of the third plate 110 of the upper plate.

Figure 5:
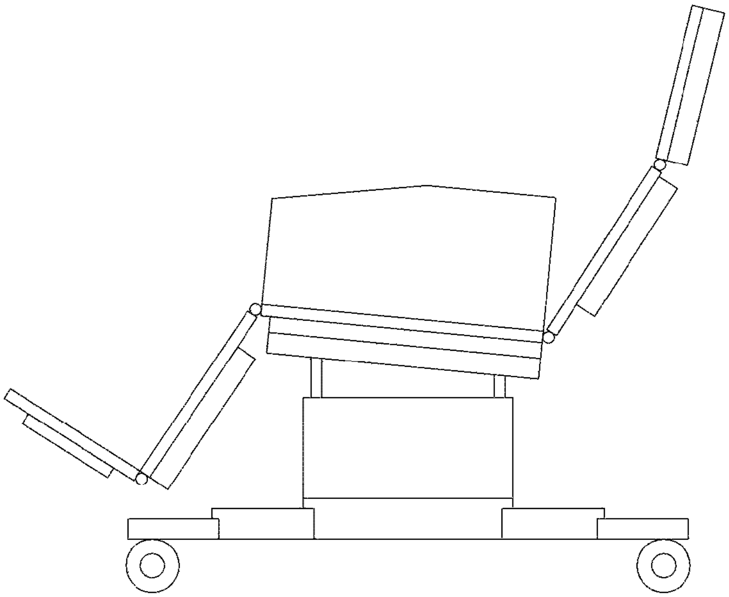
FIG. 5 illustrates a shape into which an upper plate is transformed to allow a user to go around or watch television (TV) in a state in which the transfer robot has picked the user up.
Figure 6:
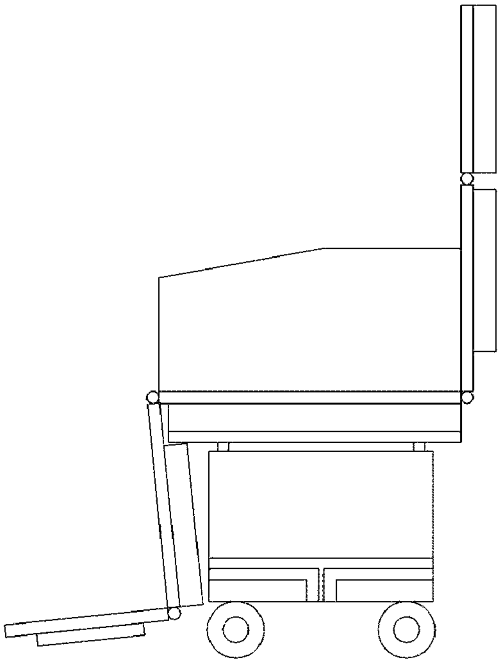
FIG. 6 illustrates a shape into which the upper plate is transformed to allow a user to defecate in a state in which the transfer robot has picked up the user.
Figure 7:
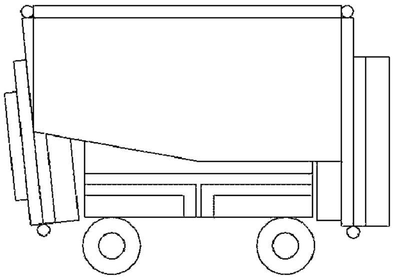
FIG. 7 illustrates a shape into which the upper plate is transformed to have a minimum volume to be positioned in a set waiting place for charging or storing the transfer robot

For example, FIG. 5 illustrates a shape into which an upper plate is transformed to allow a user to go around or watch television (TV) in a state in which a transfer robot has picked up the user. FIG. 6 illustrates a shape into which the upper plate is transformed to allow a user to defecate in a state in which the transfer robot has picked up the user (a defecation assistance function will be described below). FIG. 7 illustrates a shape into which the upper plate is transformed to have a minimum volume to be positioned in a predetermined waiting place for recharging or storing the transfer robot (all divided upper plates and safety handrails are lowered, an extension structures or telescopic mechanisms of a support of a leg is shortened to a minimum length, and wheels are gathered).

The upper plate may be automatically transformed into such various shapes by an electric motor or an equivalent mechanism. For example, when various upper plate bending modes are set in a remote controller or a control panel and a user selects a desired mode after the robot autonomously makes a determination according to a situation, the upper plate can be automatically bent in a programmed shape. Of course, the upper plate may also be bent by manpower through a manual mechanism.

Figure 8:
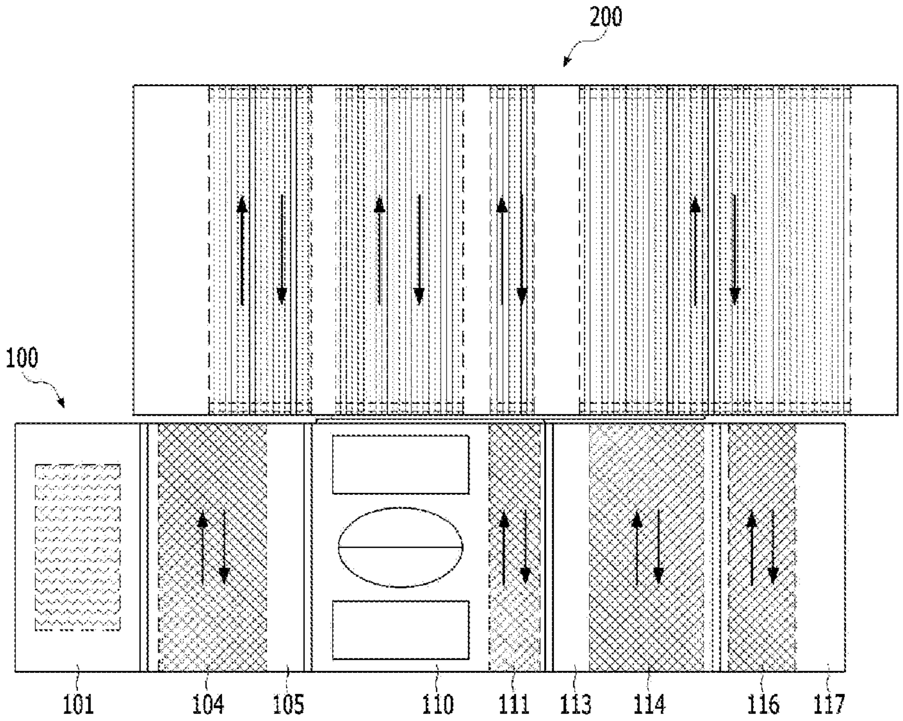
FIG. 8 is a plan view of a transfer robot (100) positioned next to a bed (200).

Shift and transfer functions of a transfer robot 100 will be described in detail. A bed 200 is positioned at an upper side in a plan view of FIG. 8. The transfer robot 100 described above is positioned at a lower side. FIG. 8 is a plan view illustrating that the transfer robot 100 is positioned on a side surface of the bed 200 with respect to a central portion of a bed mattress with which the hip of a user comes in contact and a central portion of the transfer robot.

Here, as the bed 200, a bed specifically manufactured in a structure that cooperates with the transfer robot of the present embodiment is exemplified. An example is shown in which the bed is manufactured such that a height of the bed is adjustable by a hydraulic cylinder driven by an electric motor to match a top height of the bed with a top height of the transfer robot, an upper surface of the bed is tilted to facilitate lateral transfer of a user, and similar to that applied to the upper plate of the transfer robot of the present invention, a porous flexible sheet is applied to an upper plate (mattress) of the bed to easily move the user in a lateral direction.

Figure 9:
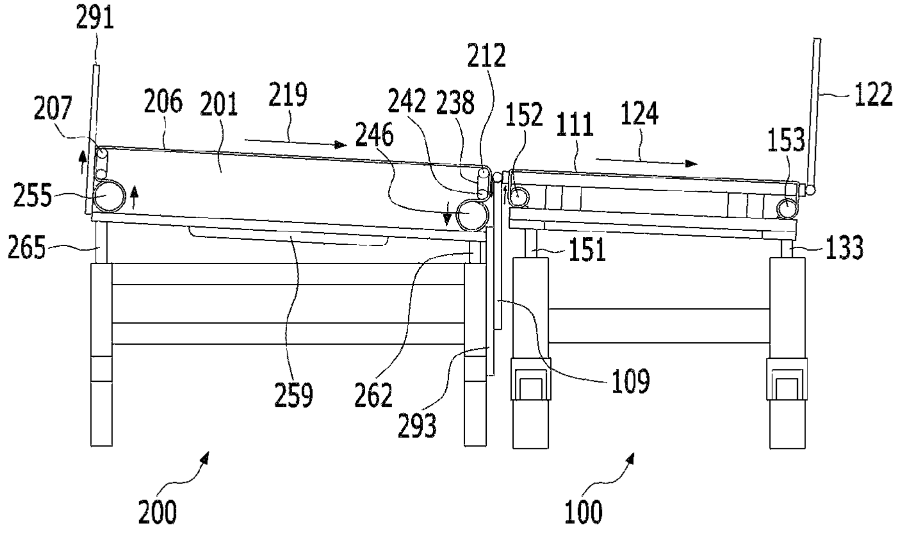
FIG. 9 is a front cross-sectional view illustrating that the bed and the transfer robot in FIG. 8 are coupled side by side through side surfaces thereof.

FIG. 9 is a front cross-sectional view illustrating that the bed and the transfer robot in FIG. 8 are coupled side by side through side surfaces thereof and illustrates a transfer situation in which a user is transferred from the bed 200 to the transfer robot 100 with the user in a lying state. Here, as just described above, a case in which the bed 200 is specially manufactured in a structure that cooperates with the transfer robot 100 is shown. (In the case of a general bed, there will be no function of tilting a bed mattress to the right as shown in FIG. 9 and a function of rotating a porous flexible sheet in the lateral direction on an upper surface of the mattress.)

First, the bed 200 shown in FIG. 9 will be briefly described. The bed 200 of FIG. 9 corresponds to a cross-sectional view of the bed shown in FIG. 8. A porous flexible sheet 206 is shown as moving from left to right as indicated by an arrow 219. To this end, the porous flexible sheet 206 is wound on each of large rollers 255 and 246 driven by electric motors (not shown) installed under the mattress. In order to move a user in a right lateral direction indicated by an arrow 219), the larger rollers 255 and 246 slowly rotate counterclockwise, thereby causing smaller rollers 207 and 212 to rotate clockwise. In addition, in order to facilitate movement of a user, the air is blown to the porous flexible sheet 206 from an air circulator 259 attached under a mattress 201 to reduce a frictional force between the porous flexible sheet 206 and a surface of the mattress 201 as much as possible.

In order for the bed 200 manufactured in this way to cooperate with the transfer robot 100 of the present embodiment, first, for the safety of a user, a left safety handrail 291 of the bed 200 is erected, and a right safety handrail 293 is lowered. Accordingly, a left safety handrail 109 of the transfer robot 100 is lowered, and a right safety handrail 122 is raised.

In an additional embodiment, the right safety handrail 293 of the bed and the left safety handrail 109 of the transfer robot may be coupled electromagnetically and may be designed such that wired/wireless communication is performed between the bed and the transfer robot. As a result, a shift function for a user can be autonomously performed by the robot.

Figure 10:
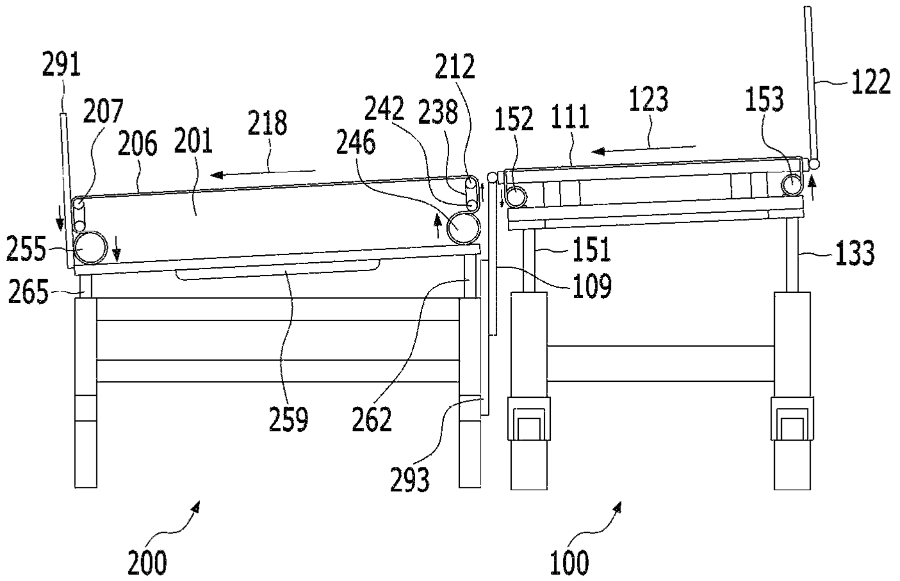
FIG. 10 is a front cross-sectional view after the bed (200) and the transfer robot (100) are coupled.

FIG. 10 is a front cross-sectional view after the bed 200 and the transfer robot 100 are coupled, and unlike the case of FIG. 9, illustrates a function of shifting a user lying on the transfer robot 100 to the bed 200 without any change.

Figure 11:
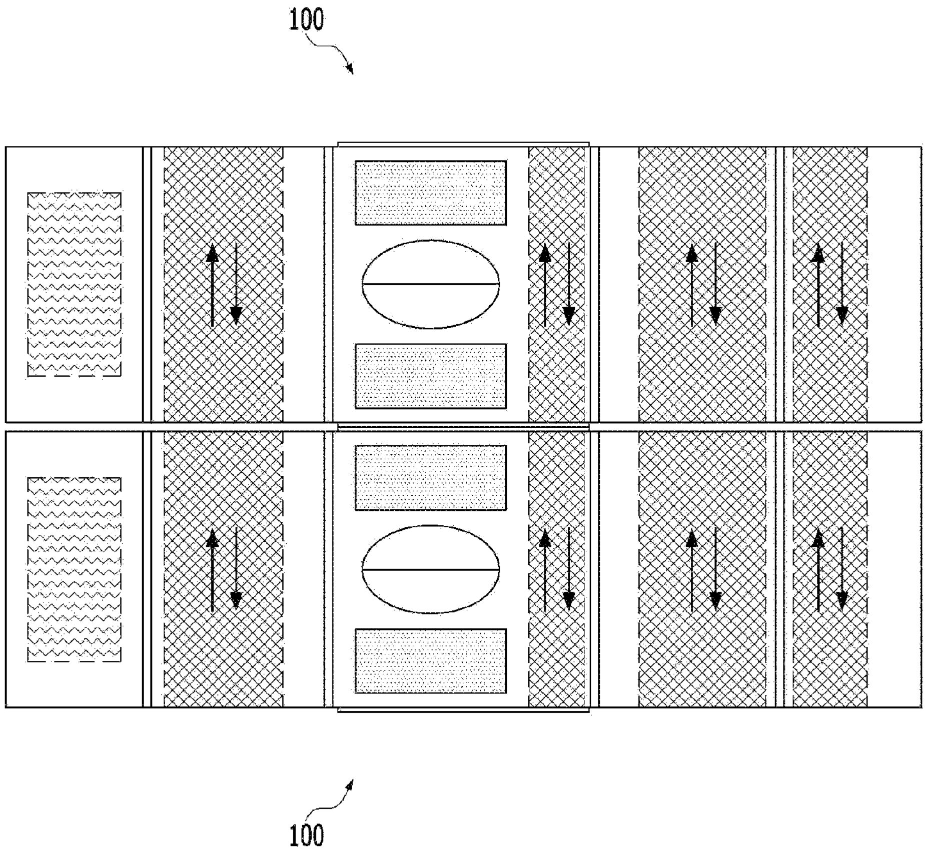
FIG. 11 is a plan view illustrating that one transfer robot (100) is positioned side by side with a side surface of another transfer robot (100).

Meanwhile, FIG. 11 is a plan view illustrating that one transfer robot 100 is positioned side by side with a side surface of another transfer robot 100 for a shift function between the transfer robots 100. In a state in which the transfer robots 100 are positioned side by side, a user lying on one transfer robot can be shifted to the other transfer robot in the lateral direction.

Figure 12:
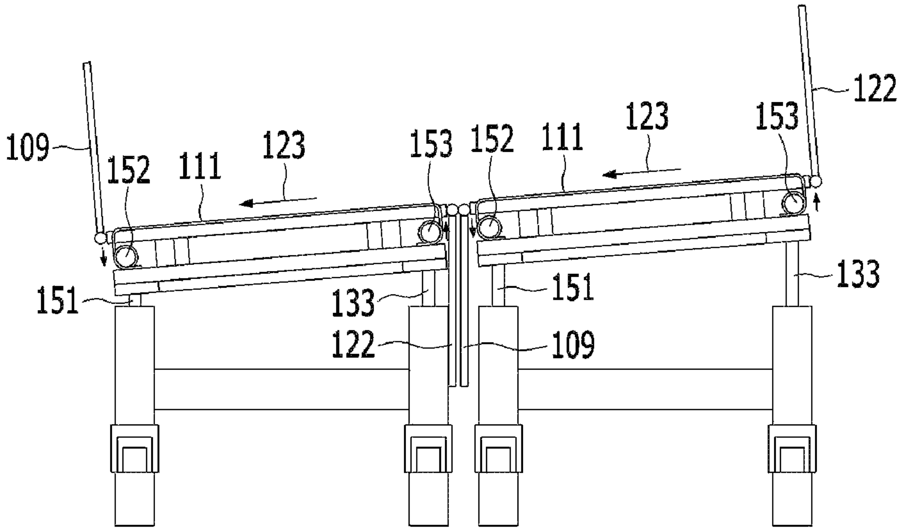
FIG. 12 is a front cross-sectional view of the case of FIG. 11 in which two transfer robots are coupled.

FIG. 12 is a front cross-sectional view of the case of FIG. 11 in which two transfer robots are coupled and illustrates an operation situation in which a user is shifted from a right transfer robot to a left transfer robot. For the safety of a user, the left safety handrail 109 of the left transfer robot is erected, the right safety handrail 122 is lowered, the right safety handrail 122 of the right transfer robot is raised, and the left safety handrail 109 is lowered. In another embodiment, an electromagnetic coupling may be made between the right safety handrail 122 of the left transfer robot and the left safety handrail 109 of the right transfer robot, and wired or wireless communication may be performed between the left transfer robot and the right transfer robot. Through such wired or wireless communication, first, in order to match a top height of the left transfer robot with a top height of the right transfer robot, upper plates of the left transfer robot and the right transfer robot are matched to be leveled using hydraulic cylinders 151 and 133 of the left transfer robot and hydraulic cylinders 151 and 133 of the right transfer robot. Then, in order to give a gentle positive tilt in a lateral movement direction of a user indicated by an arrow 123, a right hydraulic cylinder 133 of the right transfer robot is raised, a left hydraulic cylinder 151 of the left transfer robot is lowered, and rollers 152 and 153, on which the either end of the porous flexible sheets of the two transfer robots are rolled thereon, are slowly rotated counterclockwise at the same speed to shift the user from the right transfer robot to the left transfer robot in the lateral direction through the cooperation between the two transfer robots. Although not separately shown, a similar operation in the opposite direction may be performed.

<Defecation Assistance Function>

A multi-functional transfer robot according to the present invention additionally has a defecation or urination assistance function of allowing a user to defecate or urinate. The defecation or urination assistance function is started when a defecation assistance mode is selected on a remote controller or control panel. A shape of an upper plate is automatically transformed into the shape shown in FIG. 6 (or the upper plate is bent by manpower). That is, in a state in which a third plate 110 is kept horizontal, a second plate 105 is lowered by about 90°, a first plate 101 is folded horizontally at an angle of about 90° to become a footrest for a user, and a fourth plate 113 and a fifth plate 117 are erected approximately vertically. Both side safety handrails 109 and 122 are erected.

The transfer robot searches for a toilet by itself, automatically moves backward to a position at which the toilet is located (that is, moves forward in a direction of the fourth and fifth plates erected vertically), and approaches the front of the toilet. When the transfer robot arrives at the front of the toilet, the transfer robot moves further backward such that the toilet enters a space between the leg 145 and the 136 described in FIG. 3 and thus is coupled to the toilet.

In addition, when the defecation assistance function is selected, first extension structures 137 and 138 and second extension structures 139 and 140 installed at both end portions of a support 142 of the transfer robot are contracted and shortened by a telescopic mechanism to not interfere with the first plate 101 serving as a footrest at a front side and not be caught in the toilet at a rear side.

In order for the transfer robot to automatically perform the defecation assistance function, the transfer robot should communicate and cooperate with the toilet. This will be described.

Figure 13:
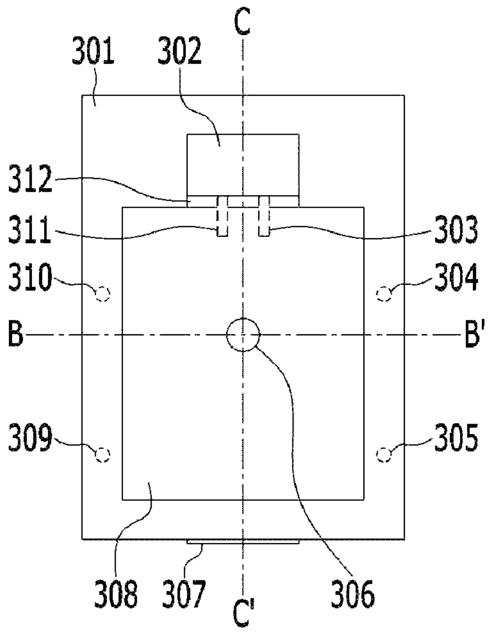
FIG. 13 is a plan view of a toilet configured to cooperate with a transfer robot.

FIG. 13 is a plan view of a toilet configured to cooperate with a transfer robot. A toilet body 301, a portion 308 in which water and waste are collected, a discharge port 306 for discharging water and waste, a nozzle 311 from which a cleaning agent is sprayed to clean the buttocks of a user, a nozzle 303 from which water is sprayed, a blower 302 for drying the buttocks of the user, and an electrical device 312 for operating the nozzles 311 and 303 are similar to components of a conventional toilet. Additionally, for an autonomous defecation assistance function of the transfer robot of the present invention, nozzles 310, 309, 305, and 304 for spraying chemicals to clean or sterilize the transfer robot (particularly, a lower part thereof) for performing the defecation assistance function are installed at peripheral portions of the toilet body, and a toilet sensor 307 for allowing the transfer robot to search for a position of the toilet and approach the toilet to be coupled to the toilet is installed, for example, at a front portion of the toilet body. Here, the blower 302 for drying the buttocks of the user can also be used to dry the transfer robot after cleaning and sterilizing the transfer robot.

Figure 14:
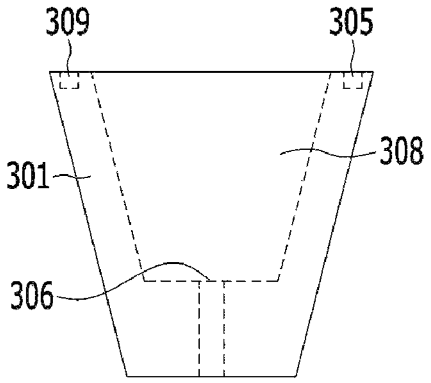
FIG. 14 is a cross-sectional view along line B-B' of FIG. 13.

FIG. 14 is a front cross-sectional view along line B-B' of FIG. 13. A discharge pipe 306 for discharging waste and water, the portion 308 in which water and waste are collected, and the nozzles 309 and 305 installed at upper peripheral portions of the toilet to clean or sterilize the transfer robot can be seen.

Figure 15:
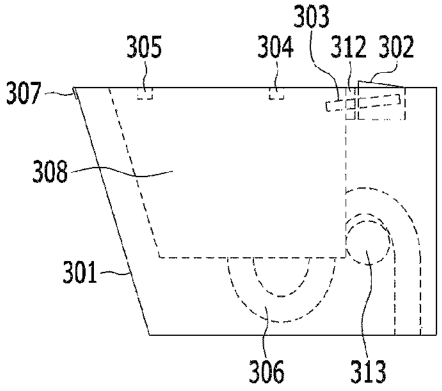
FIG. 15 is a cross-sectional view along line C-C' of FIG. 13.

FIG. 15 is a cross-sectional view along line C-C' of FIG. 13, showing the toilet body 301, the toilet sensor 307, the portion 308 in which water and waste are collected, the pipe 306 for discharging water and waste, an electric motor 313 that operates to discharge water and waste, the nozzle 303 from which water is sprayed to clean the buttocks of a user, the blower 302 for drying the buttocks of the user and the transfer robot, an electric motor or actuator 312 for operating the nozzles 311 and 303, and the nozzles 305 and 304 for cleaning or sterilizing (the lower part of) the transfer robot.

Figure 16:
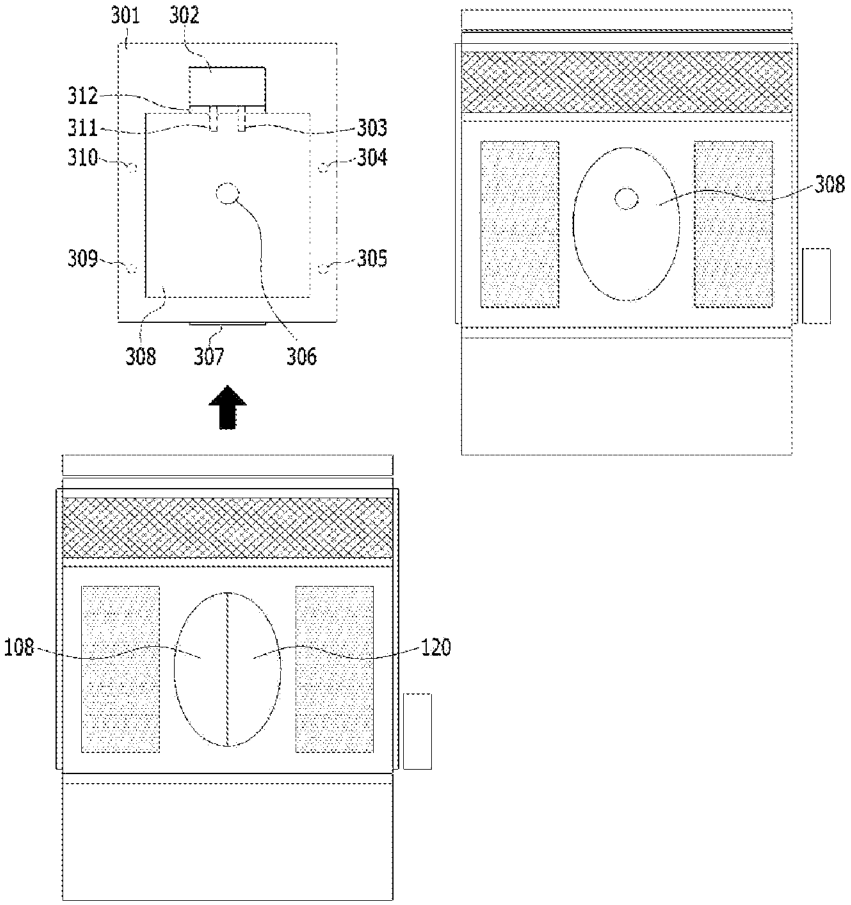
FIG. 16 shows a plan view (left) immediately before a transfer robot approaches a toilet by itself to be coupled to the toilet and a plan view (right) after the toilet enters a lower space of the transfer robot to be coupled.

In FIG. 16, the left drawing is a plan view immediately before the transfer robot approaches the toilet by itself to be coupled to the toilet, and the right drawing is a plan view after the toilet enters a lower space of the transfer robot to be coupled. As shown in the left drawing, the transfer robot communicates with the toilet sensor 307 to recognize a position and then moves backward to approach the toilet. When the coupling is completed as shown in the right drawing, a first cover 108 of an opening/closing port (see FIG. 1) of the third plate 110 of the transfer robot slides to one side, and a second cover 120 slides to an opposite side, and thus the opening/closing port is opened to allow a user to urinate and defecate in the portion 308 of the toilet in which water and waste are collected.

Figure 17:
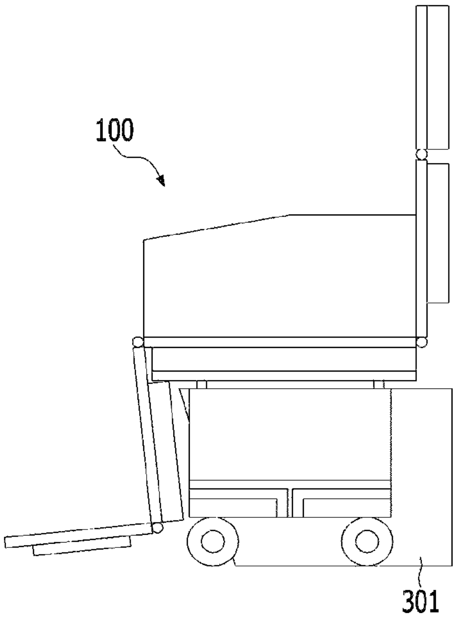
FIG. 17 is a right-side view of a transfer robot (100) coupled to a toilet body (301).
Figure 18:
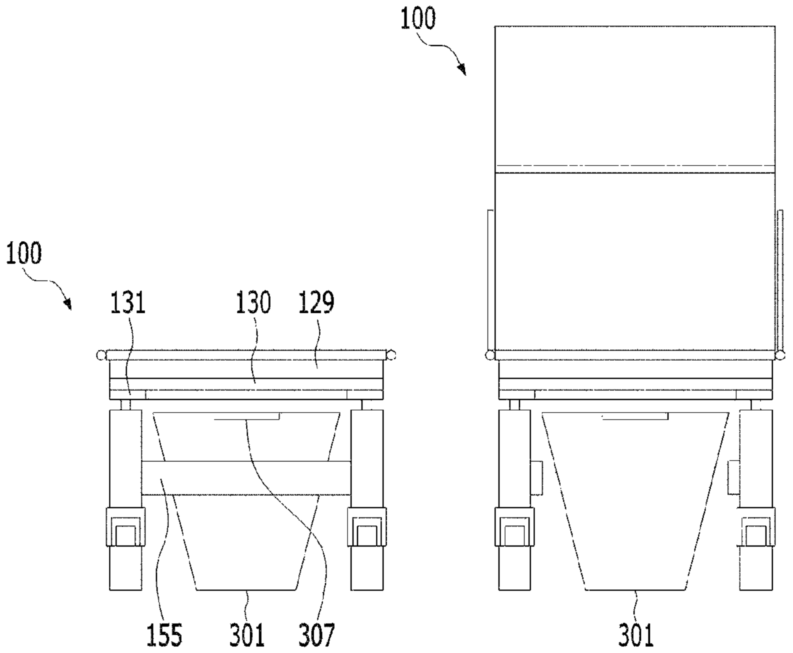
FIG. 18 shows a front view (left) and a rear view (right) of the transfer robot (100) coupled to the toilet (301).

FIG. 17 is a right-side view of a transfer robot 100 coupled to a toilet body 301. In FIG. 18, the left drawing is a front view of the transfer robot 100 coupled to the toilet body 301, and the right drawing is a rear view. As described above, since a support 155 for connecting legs at a lower portion of the transfer robot is positioned only at a front side of the transfer robot, the toilet body 301 can enter a space from a rear side to thus enter a lower space of the transfer robot 100. In another embodiment, in order for a toilet to enter a lower space of a transfer robot, a structure may be designed such that a support for connecting legs at a lower portion of the transfer robot is opened to both sides by itself to be coupled the toilet and attached to leg surfaces.

<Bathing Assistance Function>

Figure 19:
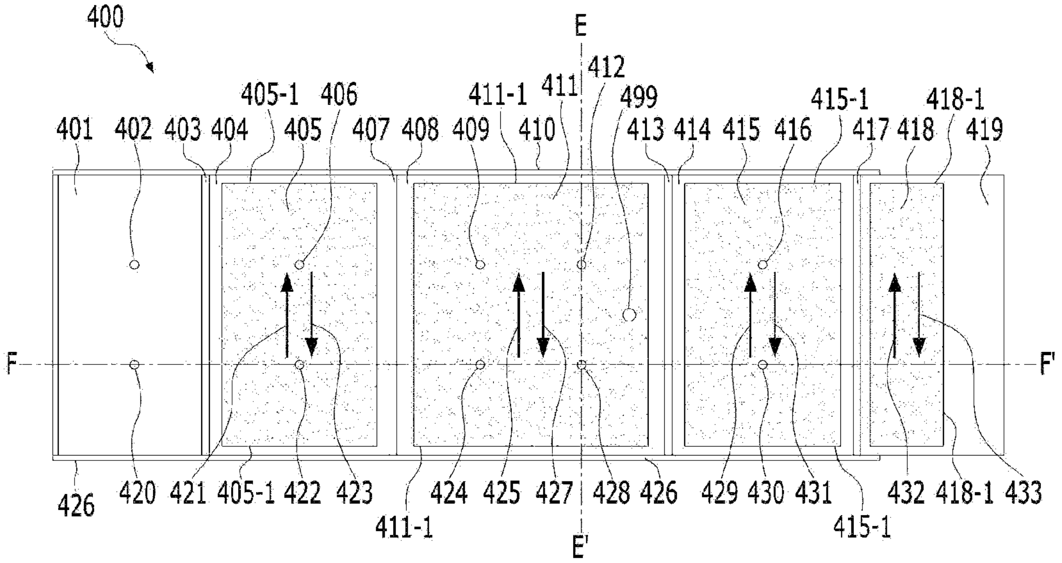
FIG. 19 is a plan view of a transfer robot for performing a bathing assistance function.

FIG. 19 is a plan view of a transfer robot for performing a bathing assistance function. A structure for the bathing assistance function is substantially the same as a structure for the shift/transfer function described above. In the following description, a configuration necessary for the bathing assistance function other than the shift/transfer function and the defecation assistance function described above will be mainly described.

Like the upper plate for the shift/transfer function described above, five divided upper plates 401, 404, 408, 414, and 419 are pivotally connected through pivot mechanisms 403, 407, 413, and 417 to constitute an upper plate such that the upper plate is bendable. From the left (that is, the front), a first plate 401 is a part with which a foot of a user comes in contact, a second plate 404 is a part with which a leg of the user comes in contact, a third plate 408 is a part with which a thigh and hip of the user come in contact, a fourth plate 414 is a part with which the back of the user comes in contact, and a fifth plate 419 is a part with which the head of the user comes in contact.

The pivot mechanisms 403, 407, 413, and 417 are provided between the plates to connect the plates and manually or electrically adjust angles of the divided upper plates 401, 404, 408, 414, and 419 such that a shape of the upper plate is transformed when the bathing assistance function is performed. Nozzles 402, 406, 409, 412, 416, 420, 422, 424, 428, and 430 for spraying water and air to clean the body of a user are installed in the first to fourth plates 401, 404, 408, and 414. A water outlet 499 that is opened and closed manually or by an electric motor is formed in the third plate 408. The water outlet 499 is used for discharging dirty water after bathing is completed.

Porous flexible sheets 405, 411, 415, and 418 may be applied to move in a lateral direction of the second to fifth plates. The porous flexible sheets are installed like rotating rolls inside the divided upper plate and exit from upper surfaces of the plates through narrow slits 405-1, 411-1, 415-1, and 418-1 formed in both sides of the plates to bidirectionally move in an arrow direction and the lateral direction on the upper surfaces of the plates. As in the shift function described above, the porous flexible sheets are used to move a user lying on the upper plate in the lateral direction to shift the user to another transfer robot or bed. Even in this case, although the porous flexible sheets are illustrated as being included in all the second to fifth plates, in another embodiment, the porous flexible sheets may be installed in one or more divided upper plates requiring the porous flexible sheets among the first to fifth plates without being applied to all the divided upper plates. Of course, the porous flexible sheet may not be applied.

The porous flexible sheets 405, 411, 415, and 418 installed to move in and out of the narrow slits 405-1, 411-1, 415-1, and 418-1 formed in both sides of the divided upper plates move at the same time in an upward direction indicated by arrows 421, 425, 429, and 432 or move at the same time in a downward direction indicated by arrows 423, 427, 431, and 433 to move a user in the lateral direction in a lying posture. In addition, when a fluid formed by mixing water and air is sprayed upward through nozzles 402, 406, 409, 412, 416, 420, 422, 424, 428, and 430 installed in the plate when a user is bathed and moves along with the porous flexible sheets 405, 411, 415, and 418 when the body of the user is cleaned, an action of cleaning the body of the user can be promoted.

Sturdy waterproof membrane frames 410 and 426 are provided around five divided upper plates, and a flexible waterproof membrane 489 (see FIG. 22) is attached to and supported on the waterproof membrane frames. The waterproof membrane frames 410 and 426 may be lifted to vertically erect the waterproof membrane 489 upward from the upper plate. Accordingly, when the bathing assistance function is selected, the upper plate of the transfer robot can be transformed into a bathtub shape (see FIG. 22).

Figure 20:
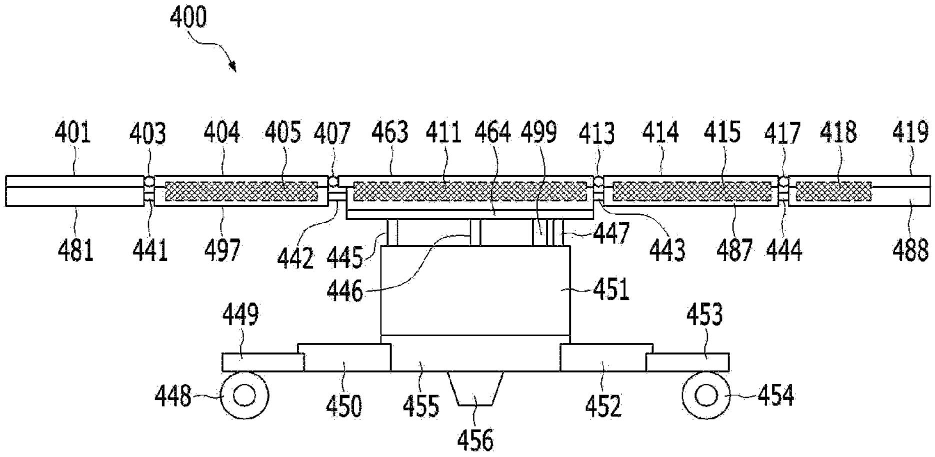
FIG. 20 is a right-side view of the transfer robot for the bathing assistance function.

FIG. 20 is a right-side view of the transfer robot for the bathing assistance function, showing the first to fifth plates 401, 404, 408, 414, and 419 from left (that is, front) to right. Descriptions of the manual or electric pivot mechanisms 403, 407, 413, and 417 and the porous flexible sheets 405, 411, 415, and 418 connecting the plates are the same as the descriptions with reference to FIG. 2. Reference numbers 441, 442, 443, and 444 denote parts that may be included in the pivot mechanisms 403, 407, 413, and 417, for example, electric hydraulic cylinders capable of adjusting an angle and height between the plates.

There are hydraulic cylinders 445 and 447 for supporting the upper plates in contact with the body of a user and adjusting a height, a front-rear tilt, and a left-right tilt of the upper plate (particularly, the third plate), a pipe 446 for supplying water and air to each nozzle of the divided upper plate, and a pipe 499 for discharging water from the upper plate. There are wheels 448 and 454 for manually or electrically moving and steering the transfer robot, wheel supports 449, 450, 452, and 453 of a telescopic mechanism for adjusting a front-rear interval between the wheels, and a frame 455 to which the wheel supports are attached. A lower structure of the upper plates is basically the same as the structure described above with reference FIGS. 2 to 4.

However, in the case of an embodiment for the bathing assistance function, in a lower structure of the upper plate, for example, a remote control switch, a shower faucet, a battery, an electric motor, a pump, a hydraulic cylinder, a hot water storage box, a wastewater storage box, and the like (not shown) may be installed in a body 451 on the frame 455, and a pipe connector 456, which is connected to a water supply facility to receive water and air for bathing and is connected to a sewage facility to discharge water, may be installed under the frame 455.

Figure 21:
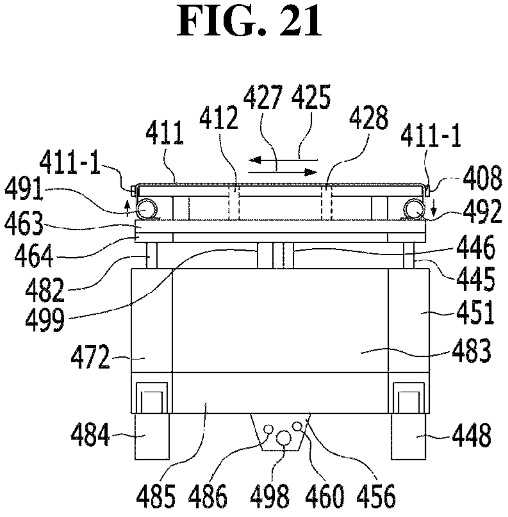
FIG. 21 is a front view of the transfer robot for the bathing assistance function (more precisely, a cross-sectional view along line E-E' of FIG. 19).

FIG. 21 is a front view of the transfer robot for the bathing assistance function (more precisely, a cross-sectional view along line E-E' of FIG. 19). There are hydraulic cylinders 482 and 445 which support the upper plate (for example, the third plate) and are driven by electric motors, there are the pipe 499 for discharging wastewater and the pipe 446 for supplying water and air, and there is the pipe connector 456 for connecting a hot water supply pipe 486, a wastewater discharge pipe 498, and an air supply pipe 460 to external facilities under a body of the transfer robot for the bathing assistance function.

A roller 491 and a roller 492 for selectively rotating the porous flexible sheet 411 bidirectionally are installed in the third plate 408 to rotate clockwise when a user is moved to the right as indicated by an arrow 427 and rotate counterclockwise when the user is moved to the left as indicated by an arrow 425, wherein the porous flexible sheet 411 is applied to exit upward through the slits 411-1 from the inside of each divided upper plate (the third plate in the drawing) and pass over the upper surface of the third plate 408 in the lateral direction. As a result, a user can be comfortably moved in the lateral direction in a lying state and transferred to another bed or transfer robot.

Figure 22:
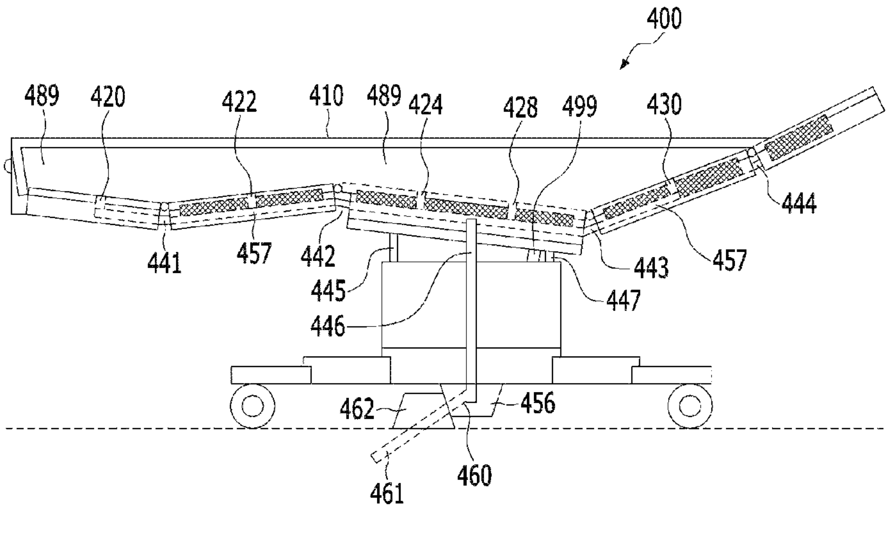
FIG. 22 is a cross-sectional view along line F-F' of FIG. 19 and is a right longitudinal cross-sectional view of a state in which a shape is transformed by bending an upper plate.

FIG. 22 is a cross-sectional view (right-side longitudinal cross-sectional view) along line F-F' of FIG. 19 and illustrates a state in which each divided upper plate of the transfer robot for the bathing assistance function of FIG. 19 is transformed into a shape in which a knee of a user is raised, the hip is lowered, and the back and head are raised to perform the bathing assistance function. For example, when a user selects a bathing assistance mode on a mode selection panel of the transfer robot, the pivot mechanisms 403, 407, 413, and 417 operated by electric motors are controlled to form the shape of the upper plate transformed as shown in FIG. 22. Of course, the upper plate may be manually bent into such a shape.

FIG. 22 also illustrates a pipe system installed for the bathing assistance function at the same time. From the left, there are a first nozzle 420, a second nozzle 422, a third nozzle 424, a fourth nozzle 428, and a fifth nozzle 430 for supplying water and air, and there are pipes 446, 457, 460, and 461 for supplying water and air to the nozzles and the pipe 499 for discharging wastewater. In FIG. 22, reference numeral 462 conceptually denotes a connector of an external facility to which the pipe connector 456 is connected.

Figure 23:
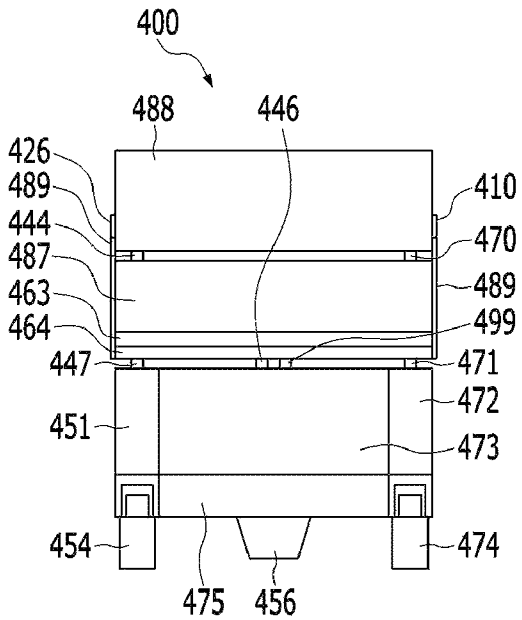
FIG. 23 is a rear view of the transfer robot for the bathing assistance function of FIG. 22 viewed from the rear.

FIG. 22 also illustrates a state after, in order to use the upper plate of the transfer robot as a bathtub, the waterproof membrane frame 410 installed around the upper plate is raised to block a periphery of the upper plate with the waterproof membrane 489 attached thereto to form the bathtub. FIG. 23 is presented to clearly show this state.

FIG. 23 is a rear view of the transfer robot for the bathing assistance function of FIG. 22 viewed from the rear. It can be seen that, in order to form a bathtub on the upper plate, the waterproof membrane frames 410 and 426 installed around the upper plate are raised, and the waterproof membrane 489 is raised along the periphery of the upper plate to form the bathtub thereon.

Figure 24:
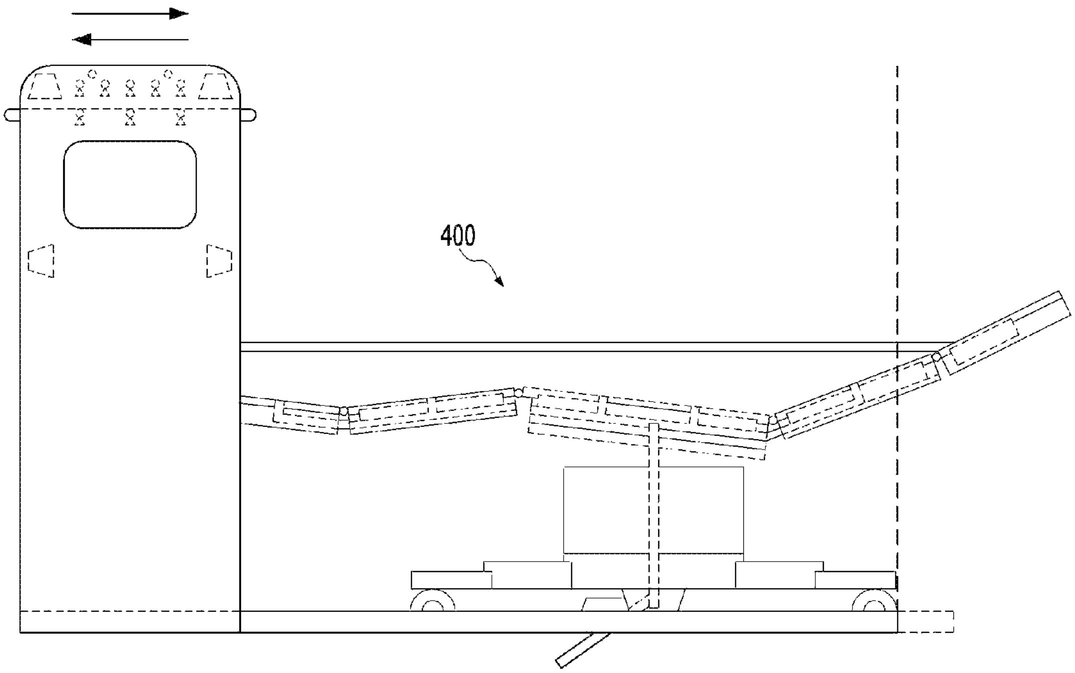
FIG. 24 is a side view of an exemplary bathing device coupled to a tunnel-type washing and drying device.

The transfer robot 400 for performing a bathing assistance function described with reference to FIGS. 19 to 23 may be used independently as a bathing assistance apparatus by bending the upper plate into a bathtub shape as shown in FIG. 22, and in another embodiment, as shown in FIG. 24, the transfer robot 400 may be used together with a tunnel-type washing and drying apparatus.

The tunnel-type washing and drying apparatus of FIG. 24 will now be briefly described. In a transfer robot 400 shown in FIG. 24, as shown in FIG. 22, a waterproof membrane 489 is raised in a bathtub shape on an upper plate, and a user lies therein. Meanwhile, a tunnel-type bathing device standing in the form of a column at the left side of FIG. 24 laterally reciprocates along a rail installed thereunder, passes over the transfer robot 400 to scan the body of a user, sprays water and a cleaning agent, and blows to dry the body when bathing is finished, and furthermore performs a skin care or sterilization function using a lotion, a powder, or the like.

Meanwhile, as described above, the transfer robot described with reference to FIGS. 19 to 23 may also be used with a bed or a transfer robot for shifting to pick up and drop off a user by, without raising the user, moving the user in a lateral direction without a change in the lying state. This has been described in detail above, and thus description thereof will be omitted.

<Autonomous Execution Scenario of Transfer Robot>

Figure 25:
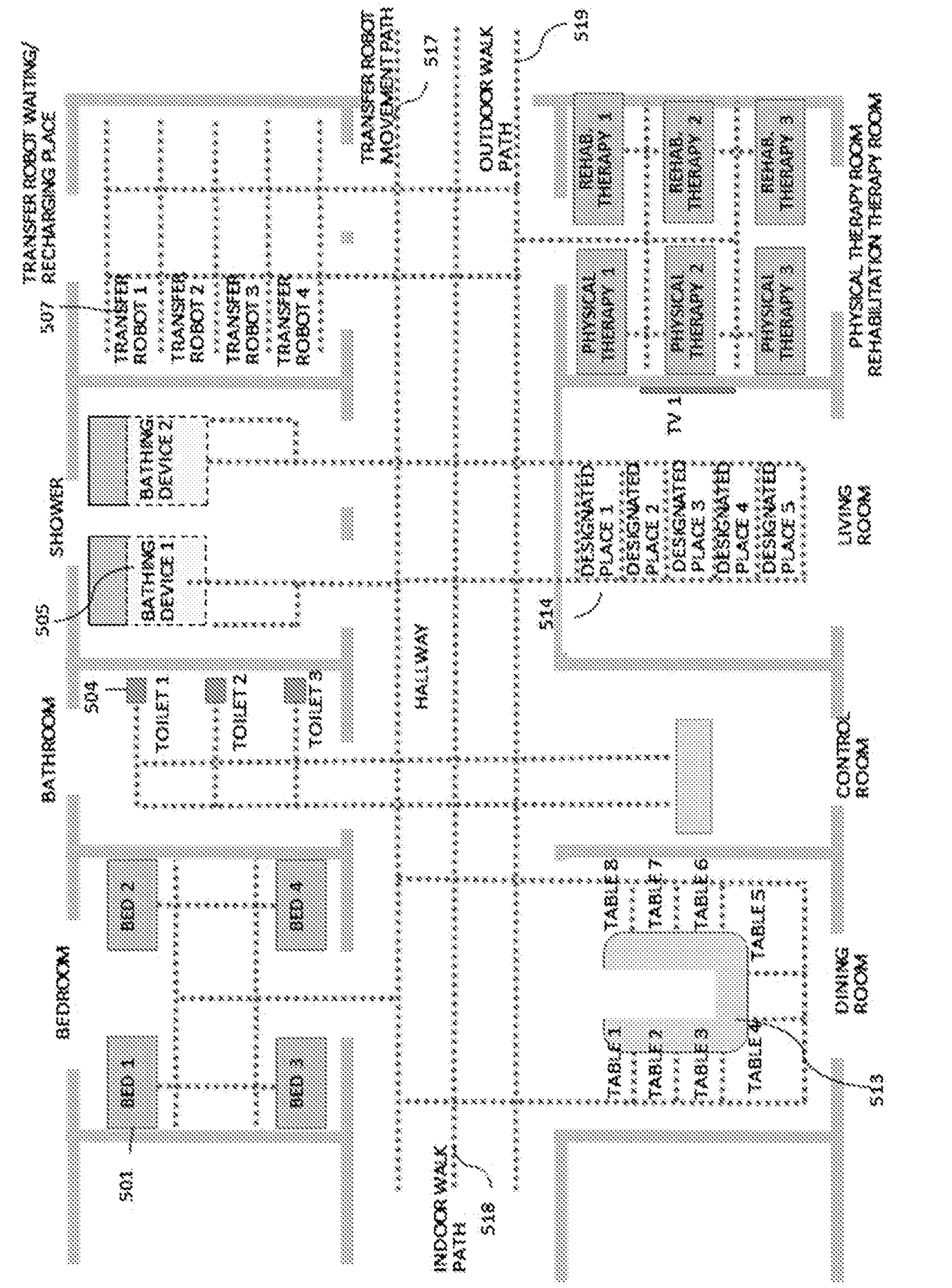
FIG. 25 is an exemplary view of a scenario in which a transfer robot autonomously performs a shift/transfer function, a defecation assistance function, and a bathing assistance function according to the present invention.

FIG. 25 is an exemplary view of a scenario in which a transfer robot autonomously performs a shift/transfer function, a defecation assistance function, and a bathing assistance function according to the present invention. Cooperation with a bathing device (robot) and a toilet is required for autonomous executions of transfer robots.

First, the transfer function will be described. The transfer robots are waiting or are being electricity-recharged at a transfer robot waiting place or recharging place. When a user wants to be transferred, the user on a bed (or bed robot)-1 501 in a bedroom calls a waiting/recharging transfer robot-1 507 in a wireless or wired communication manner, and the transfer robot-1 507 moves along a movement path 517 using e.g., an electromagnetic device capable of reading the movement path 517 of the transfer robot having an electromagnetic function. When the transfer robot-1 507 arrives at the bed-1 501 in the bedroom, the transfer robot-1 507 is coupled to the bed-1 501. Through mutual cooperation, the user is shifted from the bed-1 501 to the transfer robot-1 507, and the transfer robot-1 507 separates from the bed-1 501. When the user wants to go to a dining room, the transfer robot-1 507 picks up the user and transfers the user to a dining table-1 513 in the dining room. When the user wants to watch TV after eating, while carrying the user, the transfer robot-1 507 moves to a designated place-1 514 in a living room. When the user wants physical therapy, while carrying the user, the transfer robot-1 507 moves to a physical therapy room, and when the user wants rehabilitation therapy, while carrying the user, the transfer robot-1 moves to the rehabilitation therapy room. When the user wants to take a walk in a building (or indoors), the transfer robot-1 507 takes an indoor move along an indoor walk path 518, and when the user wants to take a walk outside, the transfer robot-1 507 takes an outdoor move along an outdoor walk path 519. When the user wants to return to the bed-1 501 in the bedroom, while carrying the user, the transfer robot-1 507 moves to the bedroom to be coupled to the bed-1 501 and shifts the user to the bed-1 50 to put the user down. Then, the transfer robot-1 507 separates from the bed-1 501. Finally, the transfer robot-1 507, which has completed its mission, moves to a bathing room for self-cleaning and self-sterilizing and is coupled to a bathing device (or robot)-1 505. The bathing device-1 505 cleans or sterilizes the transfer robot-1 507 for a set time, the transfer robot-1 507, which has been cleaned or sterilized, returns to the robot waiting/recharging place to wait or be charged.

Next, the defecation assistance function will be described. While the transfer robots are waiting or being charged in the waiting place or charging place, the defecation assistance function may be initiated by a call of a user, and while the above-described transfer function is performed, the defecation assistance function may be performed by a command of the user. When the user wants to urinate, while carrying the user, the transfer robot-1 507 moves to a toilet-1 504 of a bathroom to be coupled to the toilet-1 504. When the user finishes urinating, the toilet-1 504 cleans/sterilizes the user with a cleaning/sterilizing device installed in the toilet-1, dries the user with a drying device attached to the toilet-1 504, and then cleans/dries the transfer robot-1 507. The transfer robot-1 50 separates from the toilet-1 504.

Finally, the bathing assistance function will be described. Similarly, while the transfer robots are waiting or being recharged in the waiting place or recharging place, the bathing assistance function may also be initiated by a call of a user, and while the above-described transfer function is performed, the bathing assistance function may be performed by a command of the user. When a user on the bed-1 501 of the bedroom wants to take a bath, the bed-1 501 transmits a bath preparation signal in a wireless or wired communication manner to the bathing device-1 505 in the bathroom, and upon receiving the signal, the bathing device-1 505 calls the transfer robot-1 507 that performs the bathing assistance function. As another scenario, when the user wants to take a bath, the bed-1 501 may directly call the transfer robot-1 507 for the bathing assistance function without calling the bathing device-2 505. The transfer robot-1 507 that has received a wireless or wired communication call from the bed-1 501 moves to the bedroom to be coupled to the bed-1 501. The bed-1 501 and the transfer robot-1 507 cooperate to shift the user from the bed-1 501 to the transfer robot-1 507, and the transfer robot-1 507 picks up the user and moves to the bathroom while carrying the user. When the transfer robot-1 507 arrives at the bathing room, while carrying the user, the transfer robot-1 507 is coupled to the bathing device-1 505 to operate the bathing device-1 505 to sequentially perform scanning, cleaning, drying, and skin care on the user. After the operation is completed, the transfer robot-1 507 is separated from the bathing device-1 505, and the transfer robot-1 507 moves the user to the bedroom. After leaving the bedroom, the transfer robot-1 507 enters the bathroom again to be self-cleaned/sterilized and then moves to the robot waiting/recharging place to wait.

<Software Algorithm for Autonomous Execution>

Figure 26:
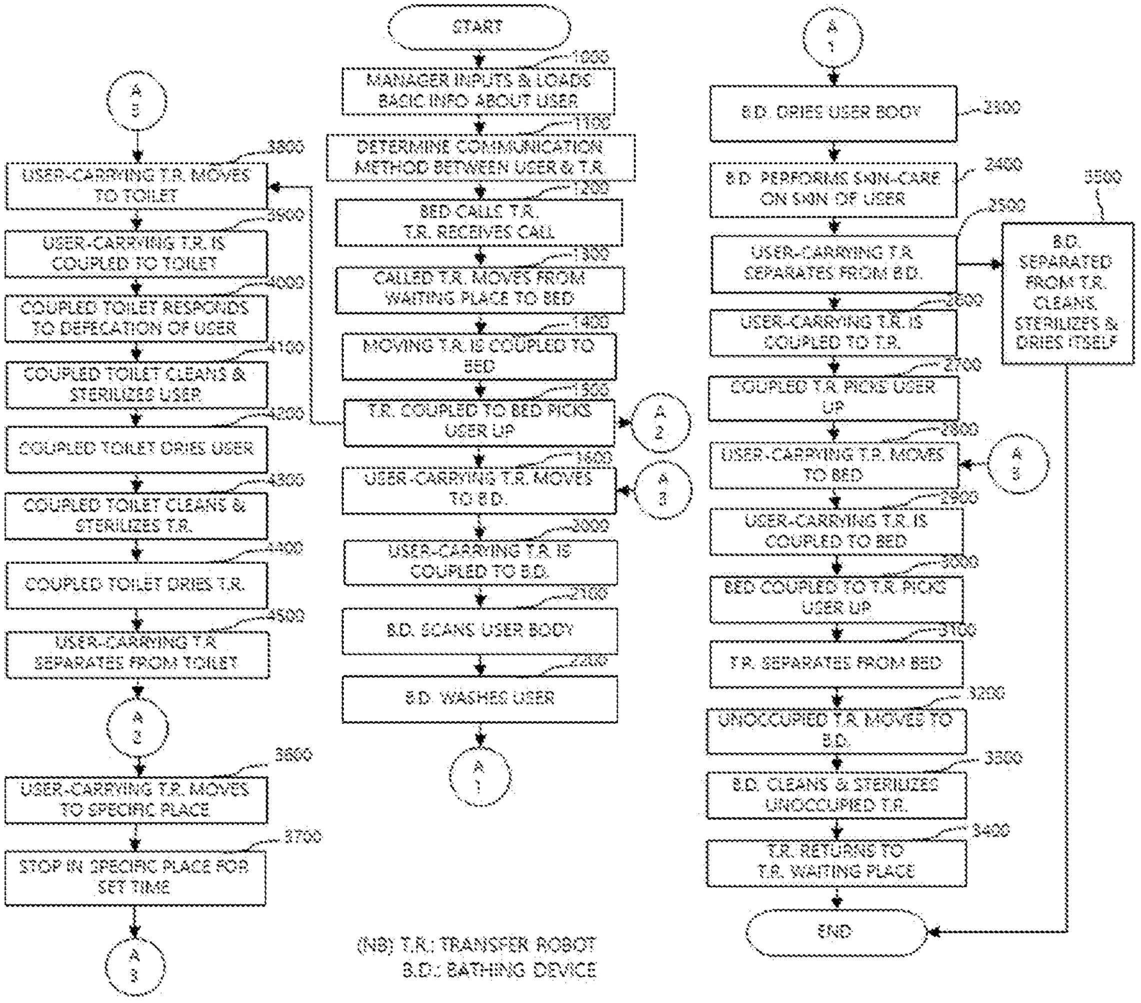
FIGS. 26 to 59 are flowcharts of a software program that performs functions and control of a transfer robot of the present invention.
Figure 27:
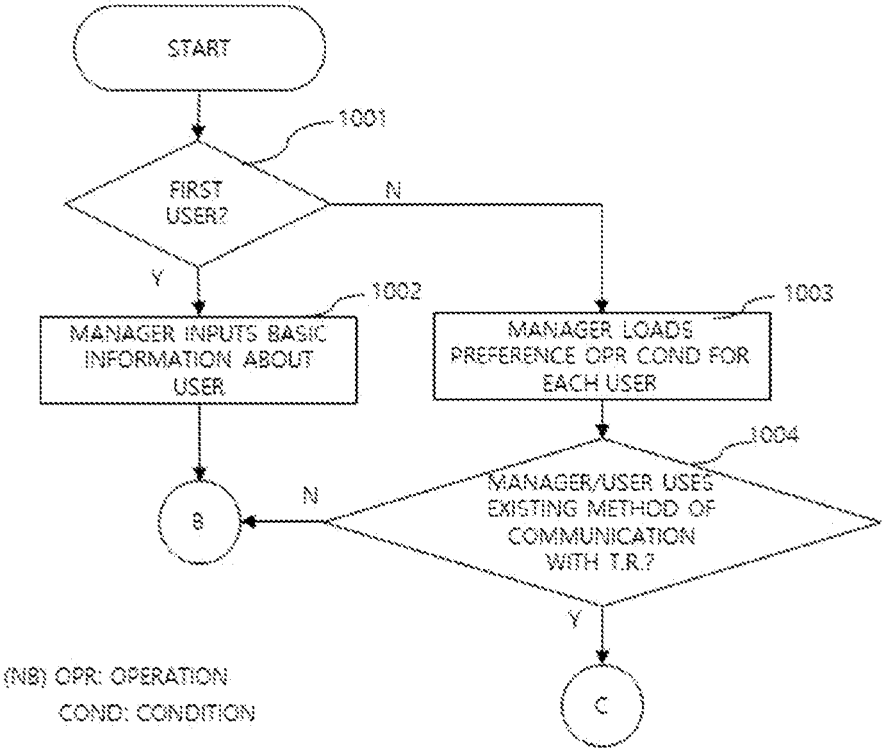
Figure 28:
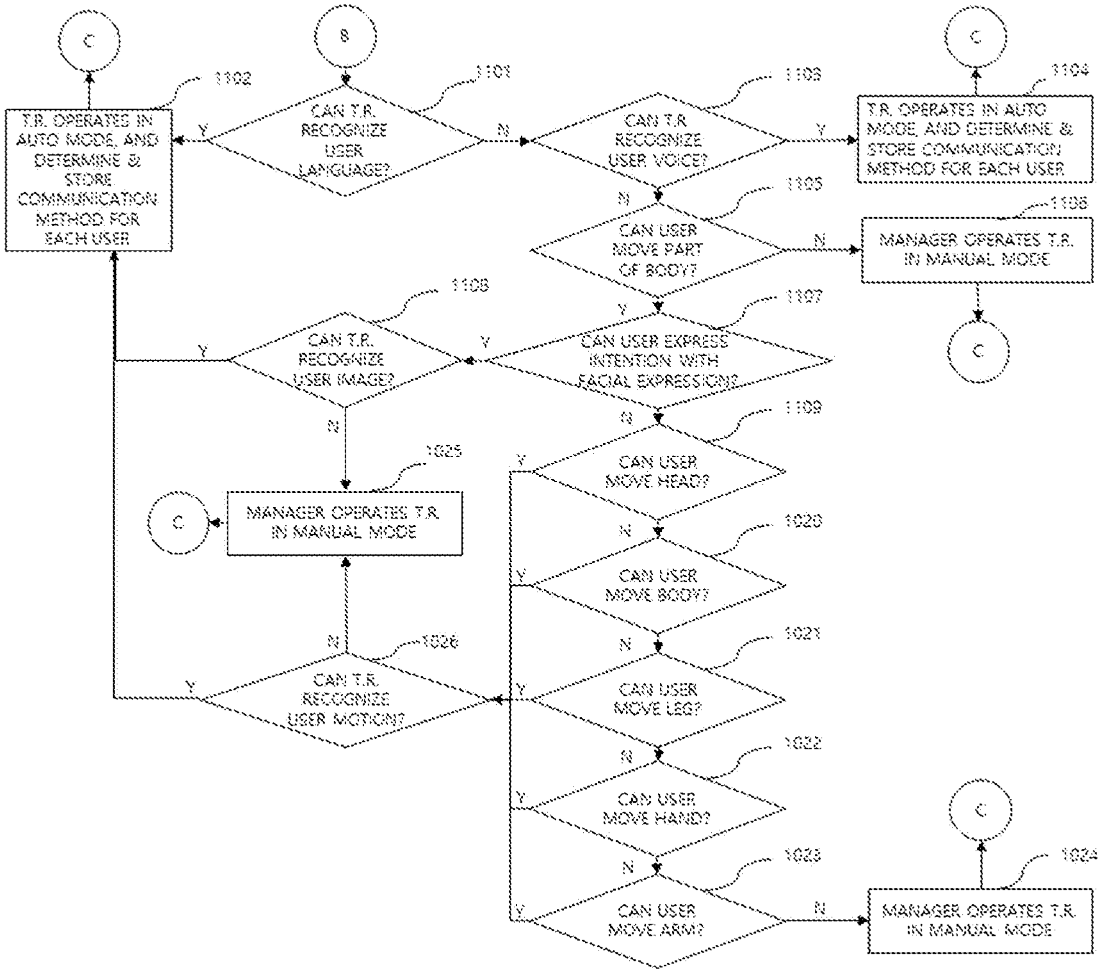
Figure 29:
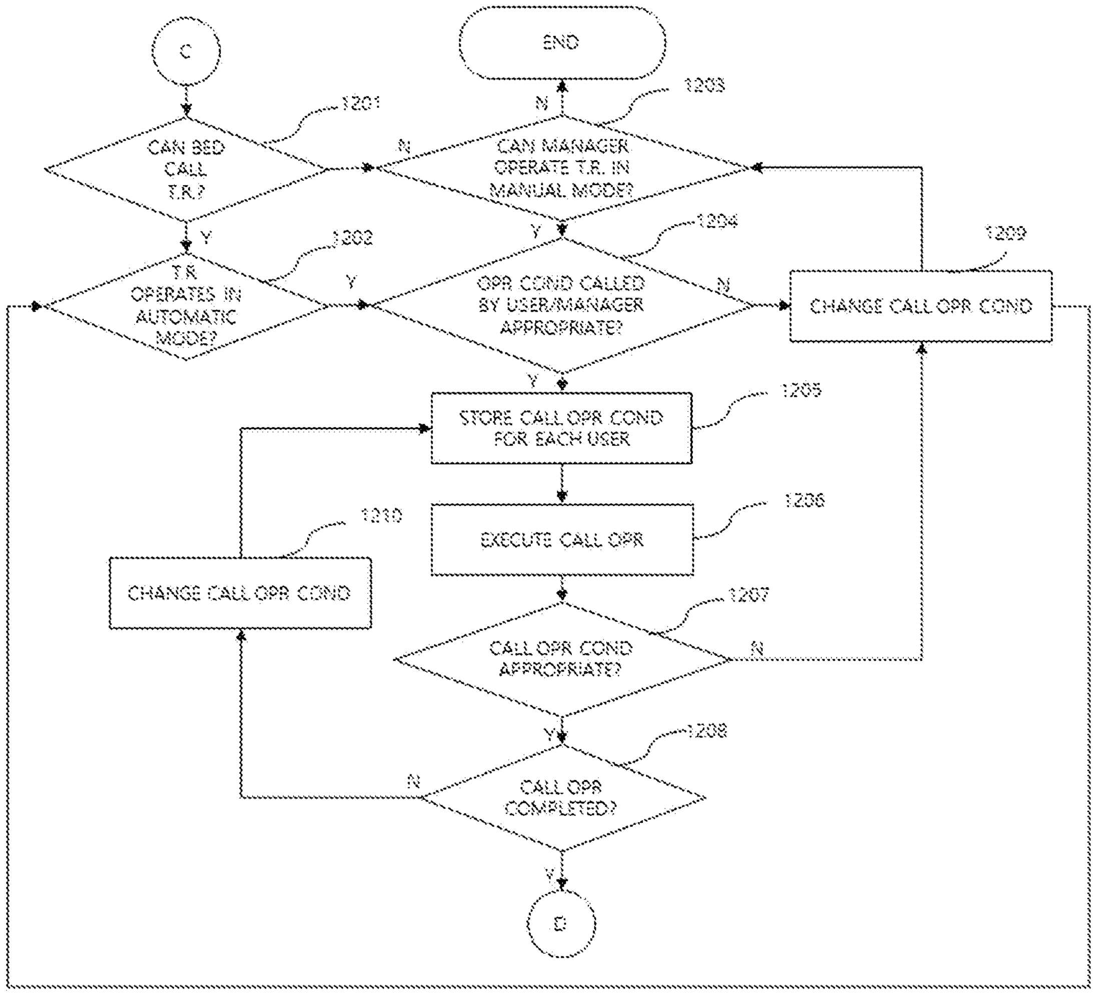
Figure 30:
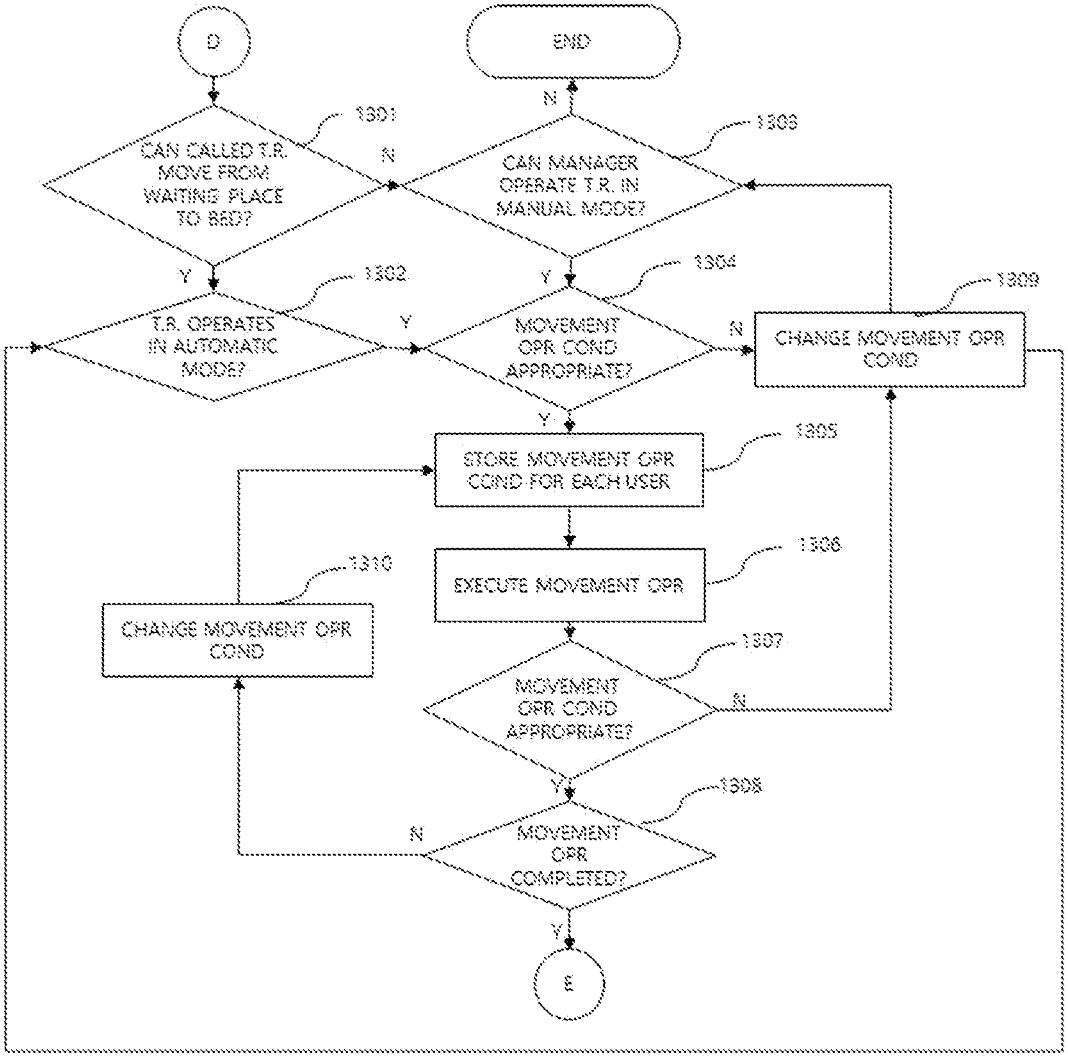
Figure 31:
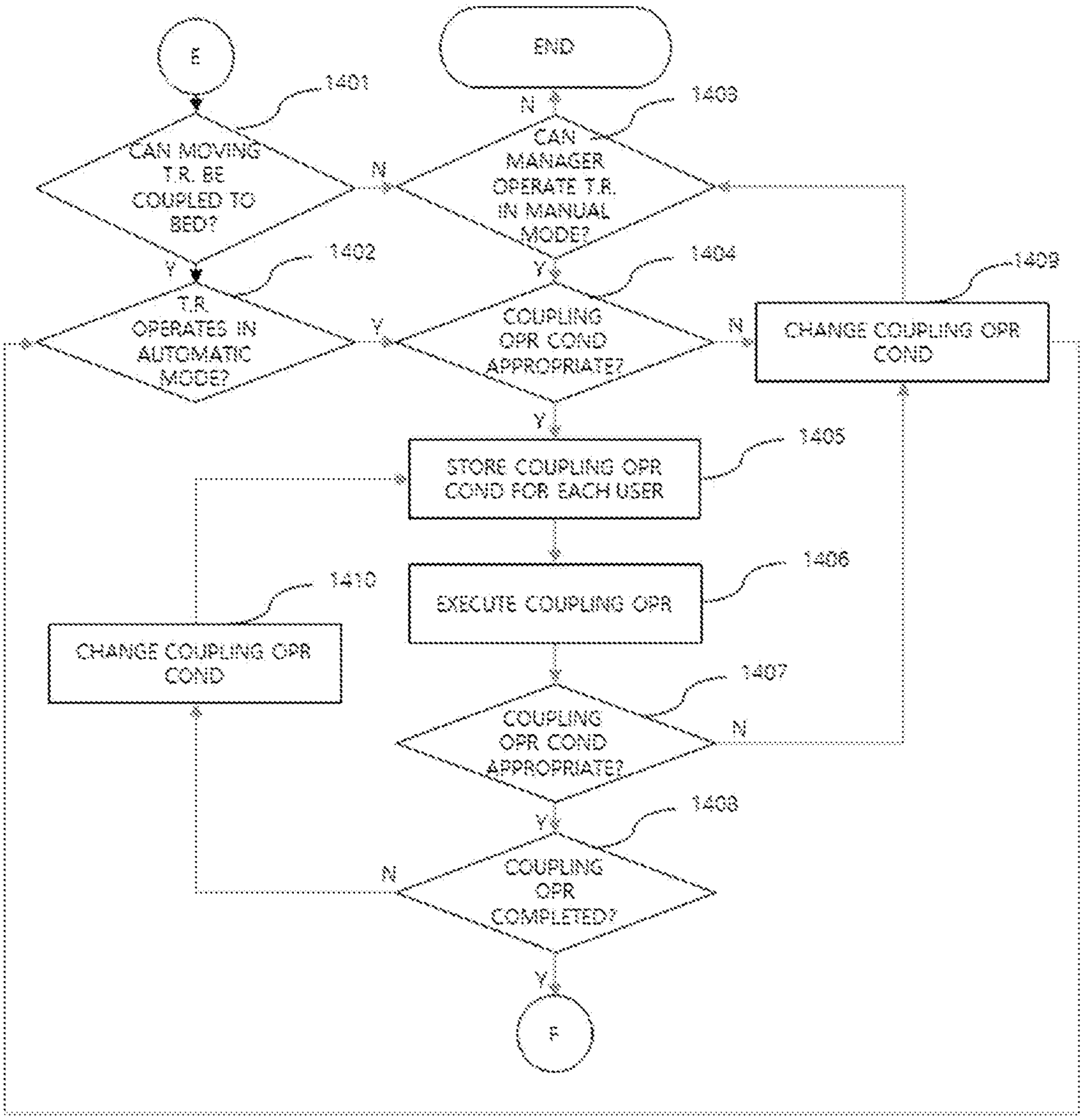
Figure 32:
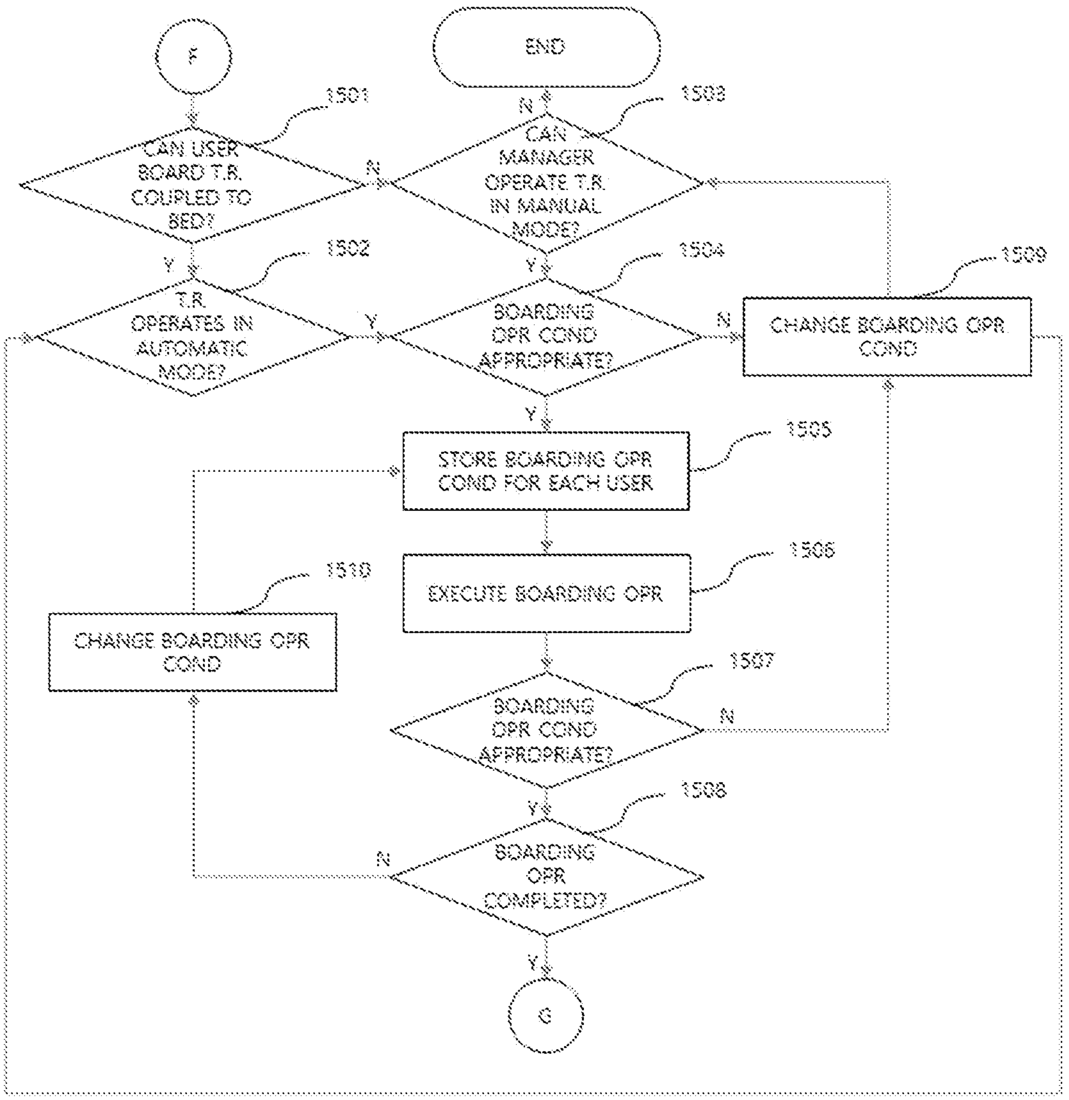
Figure 33:
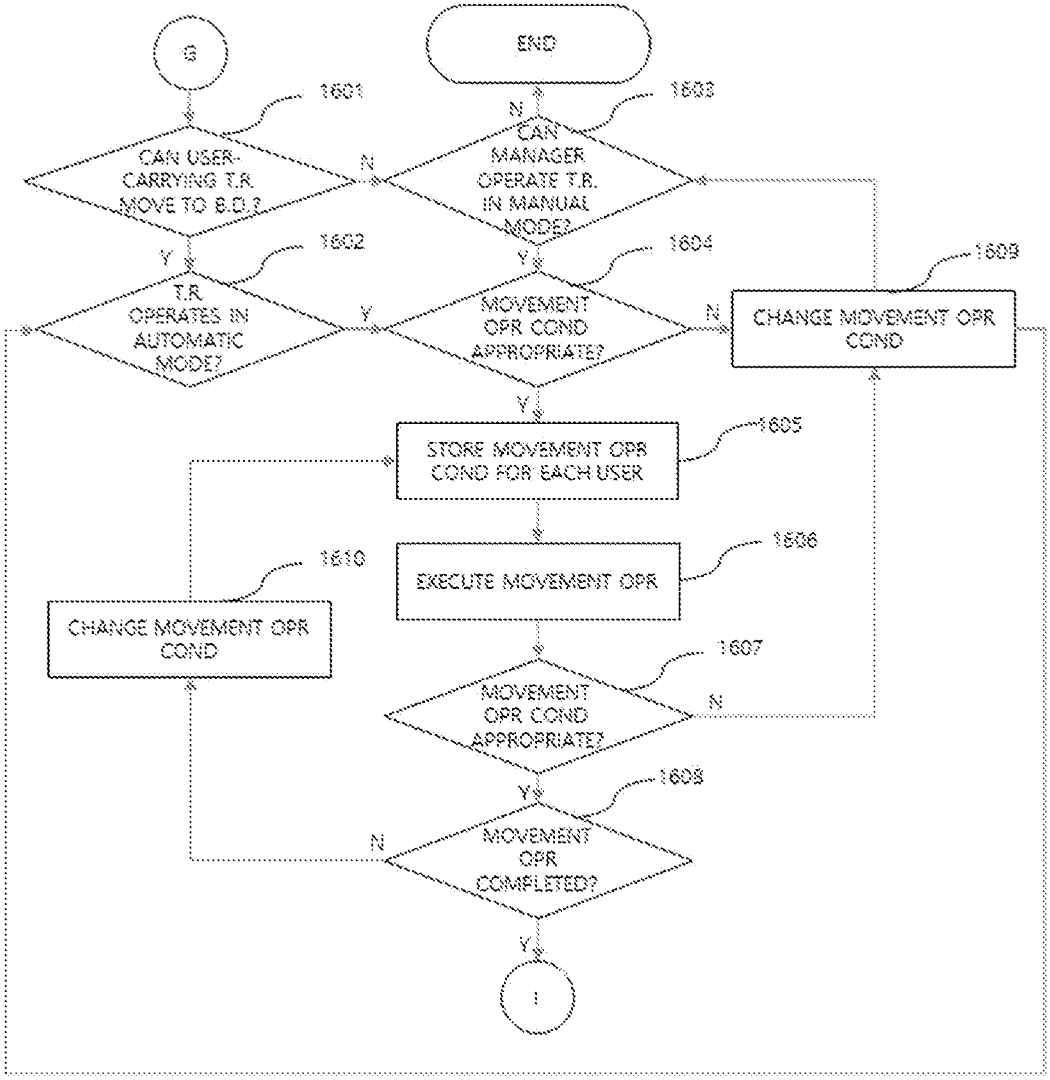
Figure 34:
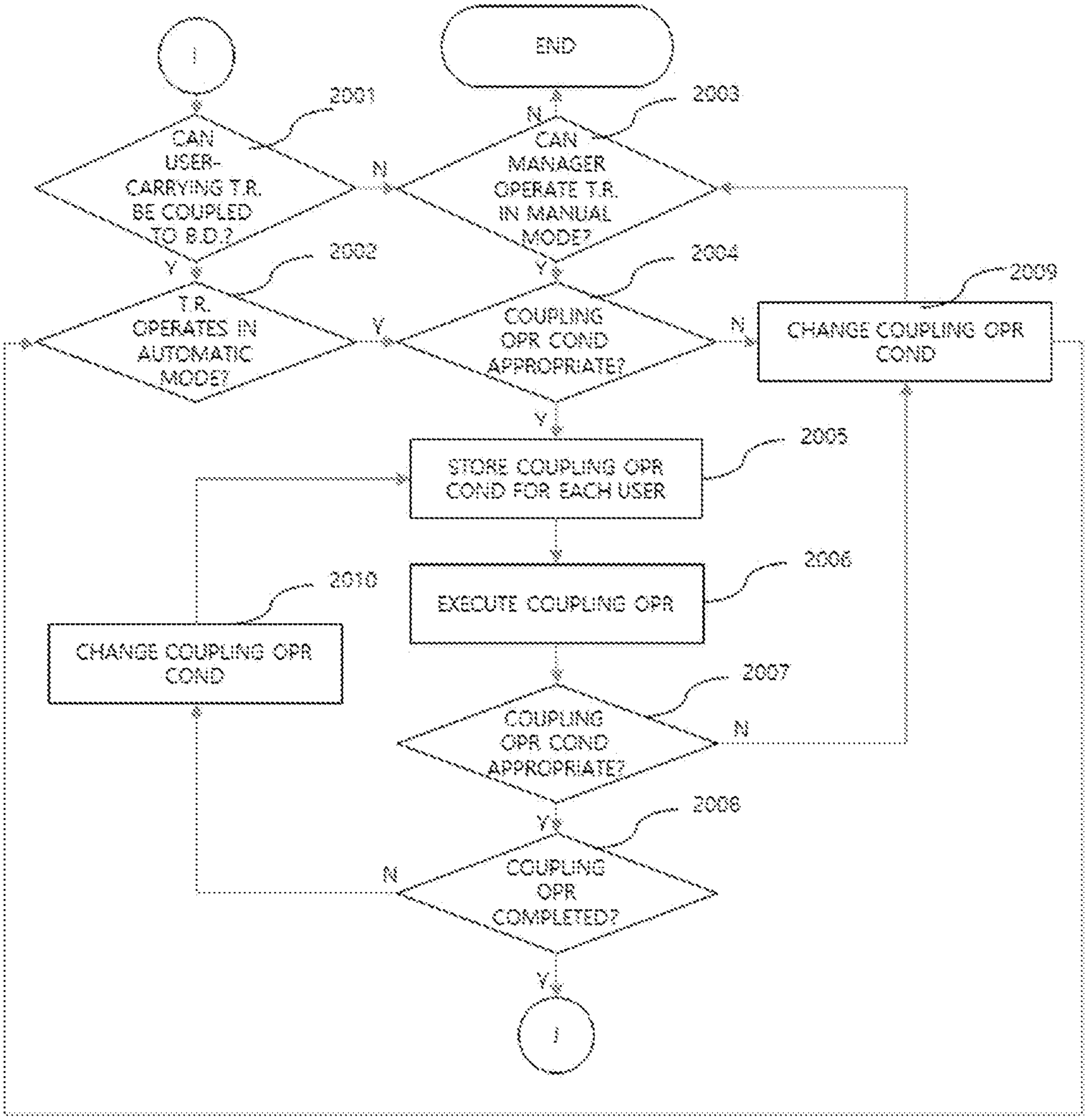
Figure 35:
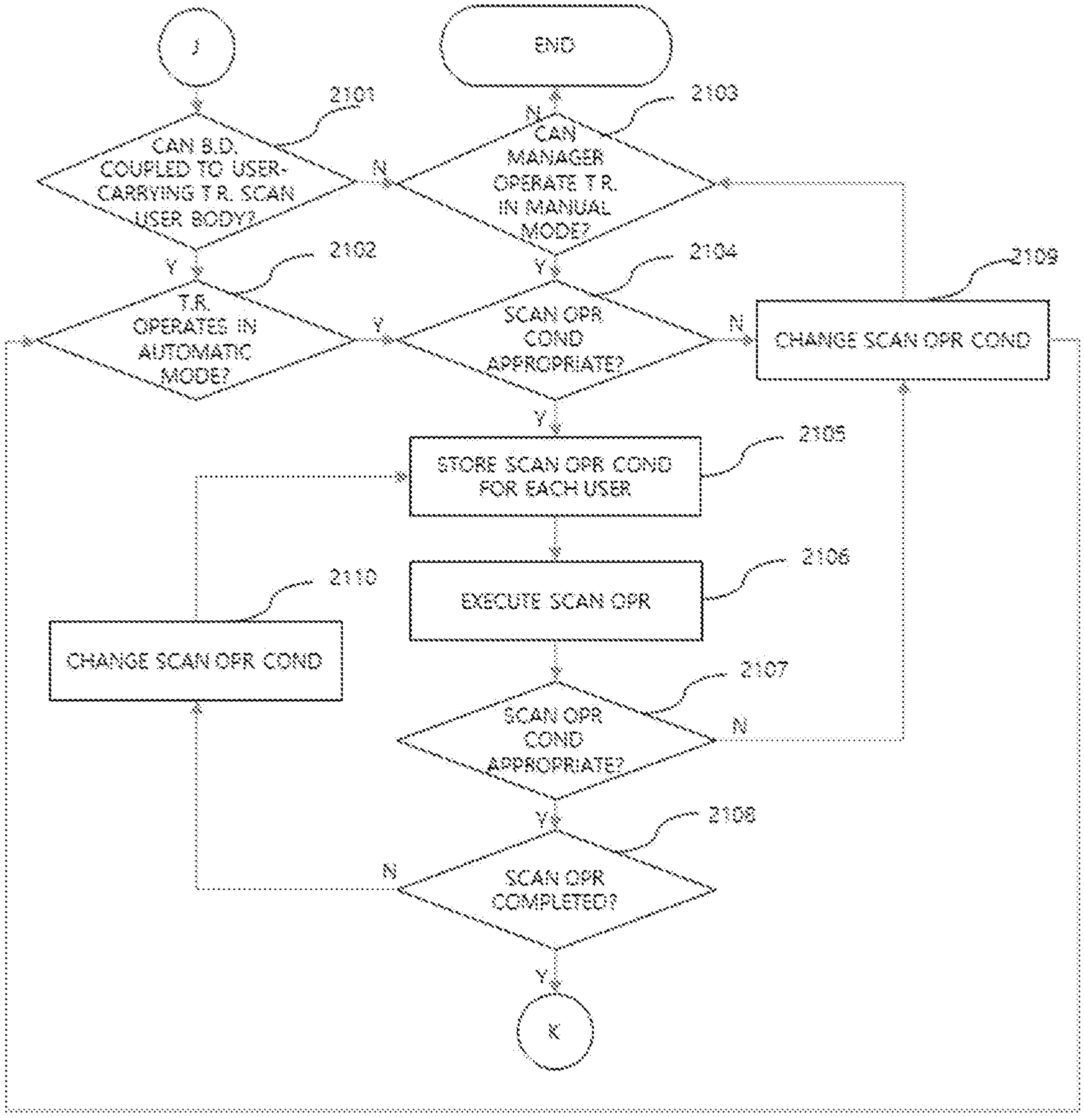
Figure 36:
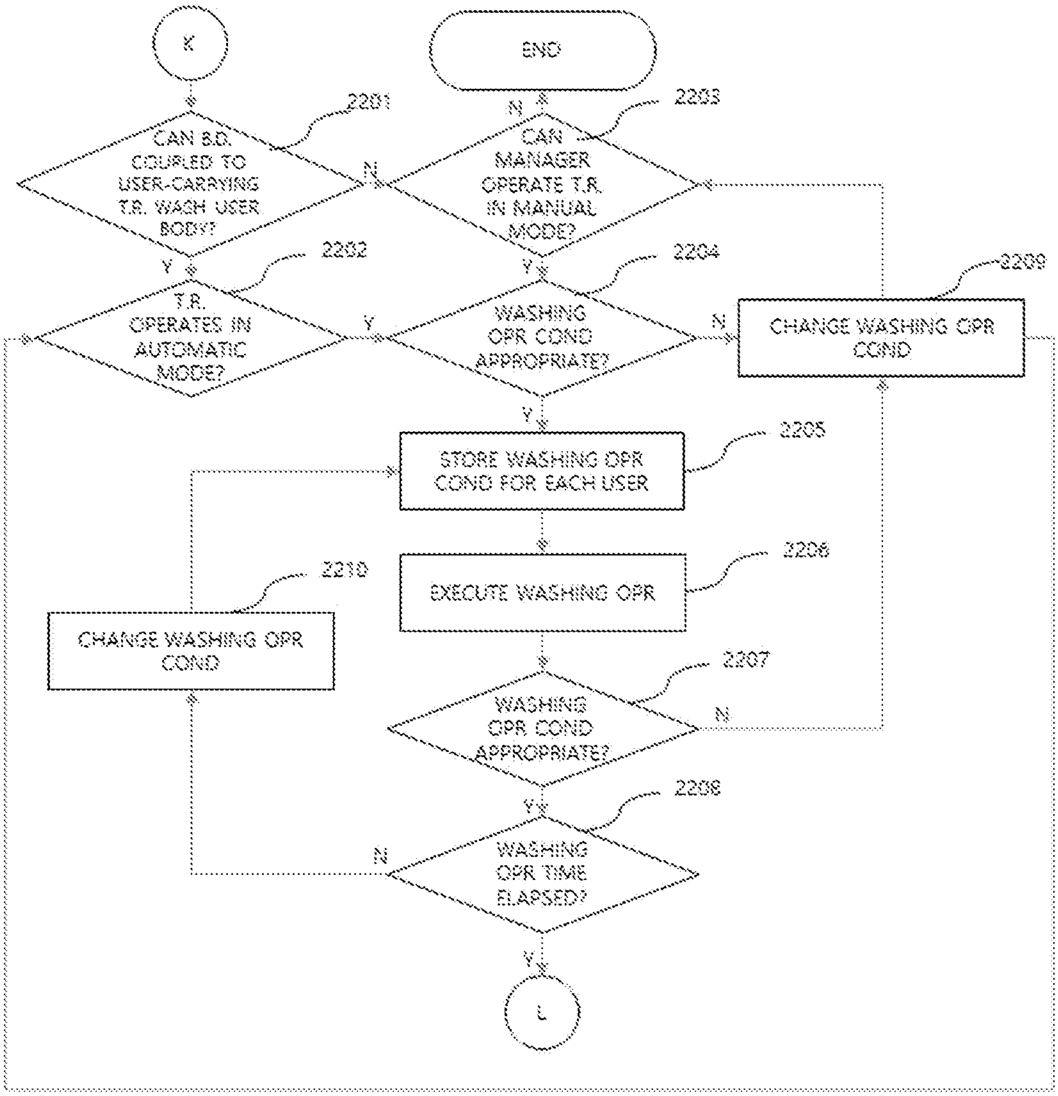
Figure 37:
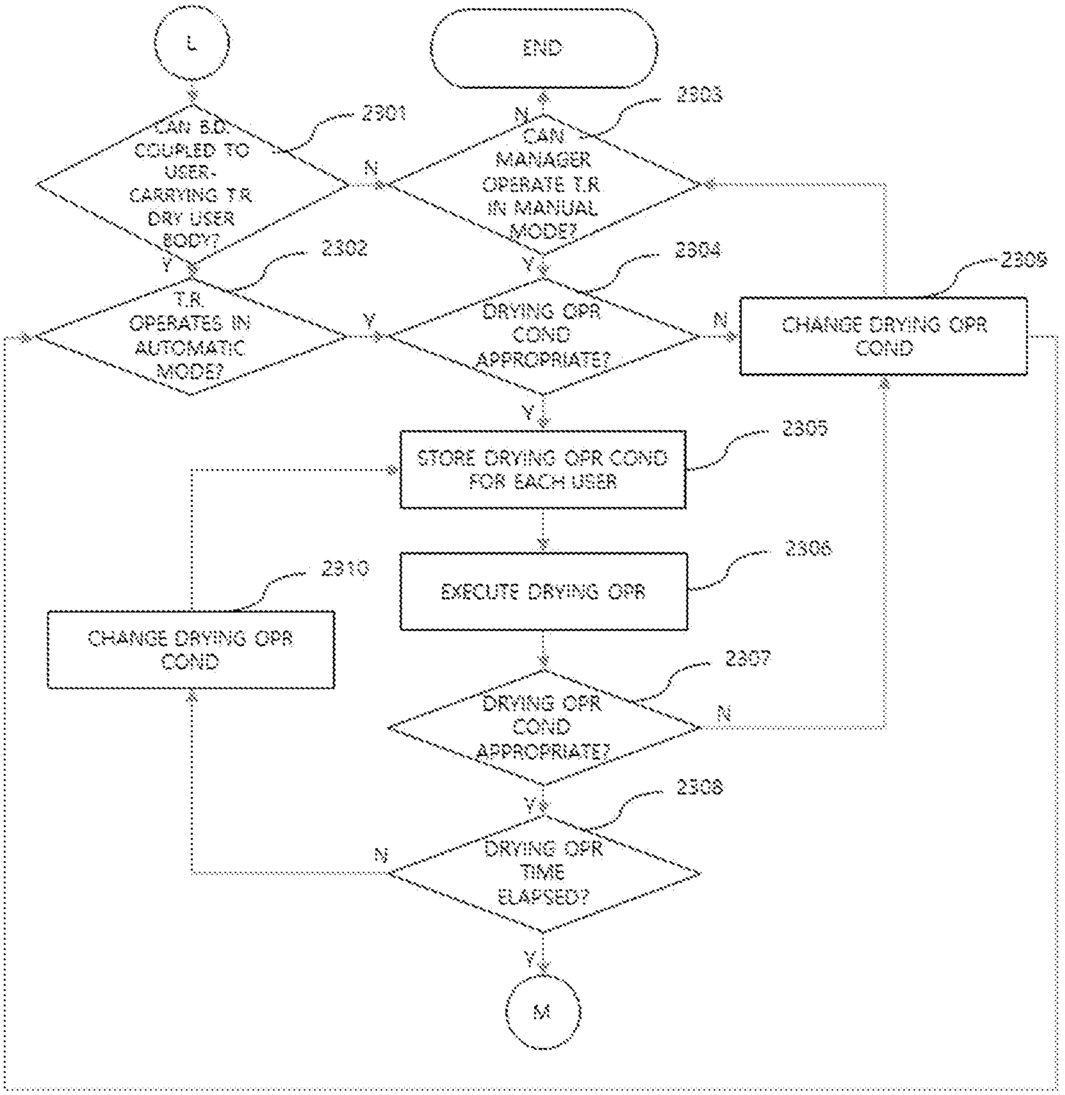
Figure 38:
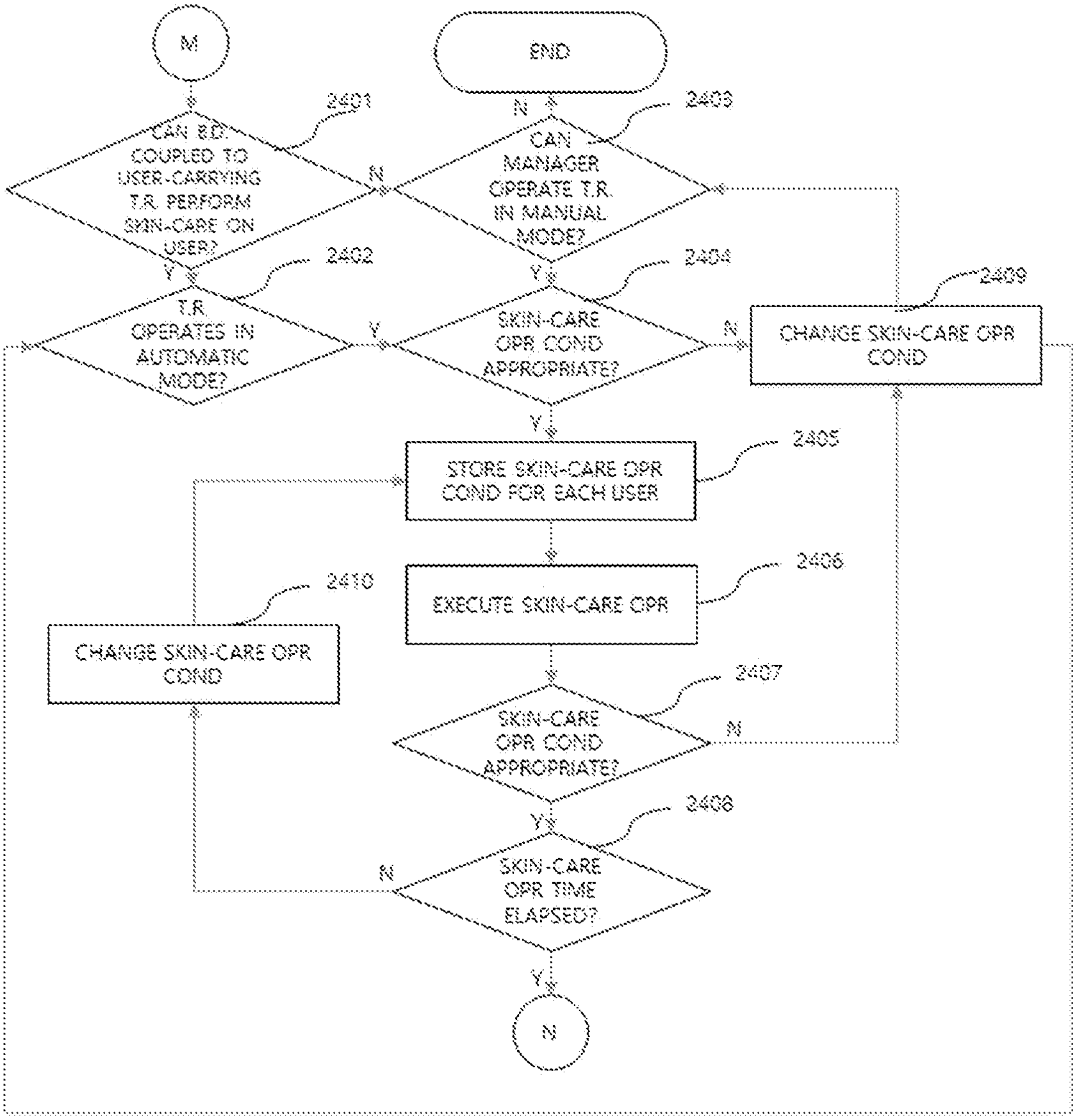
Figure 39:
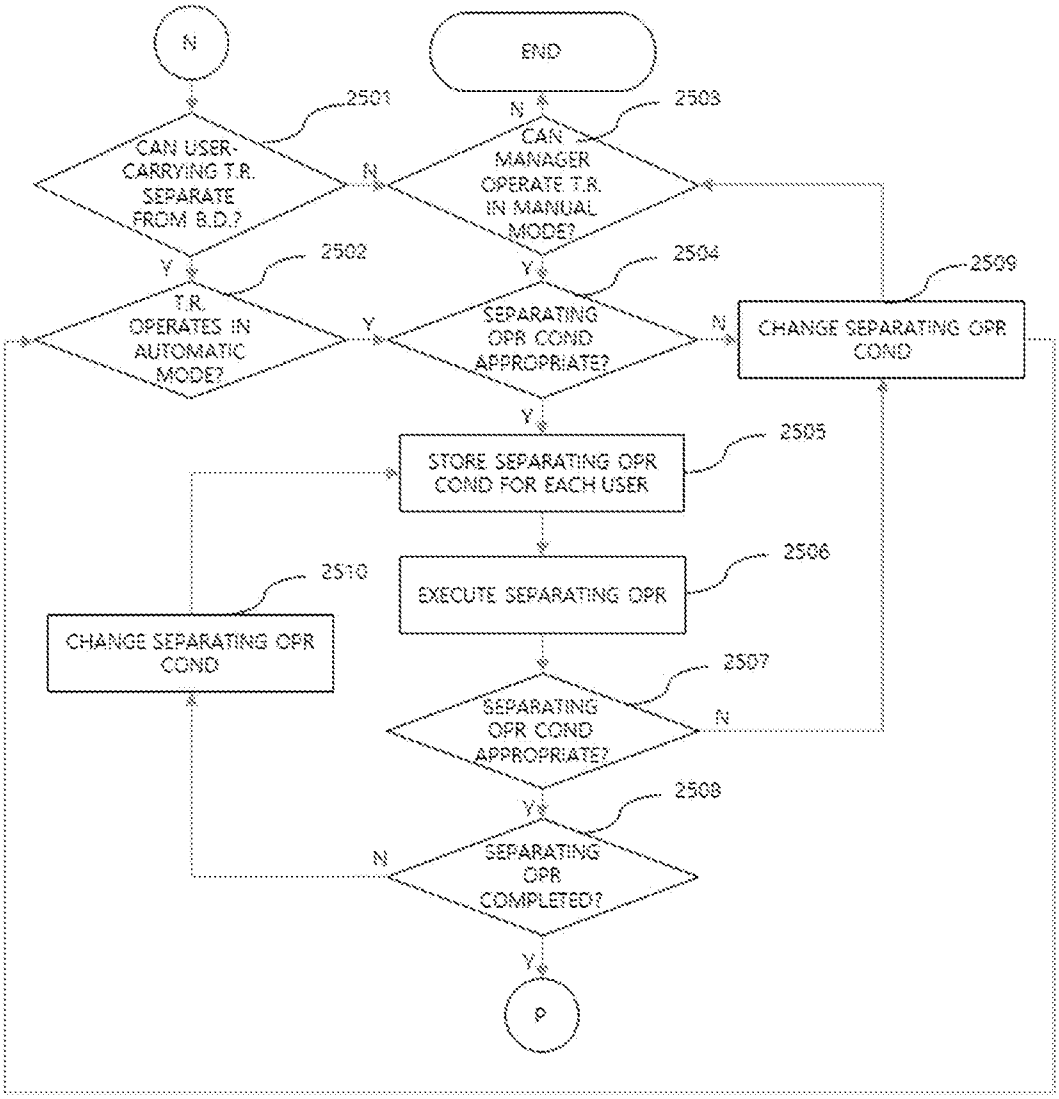
Figure 40:
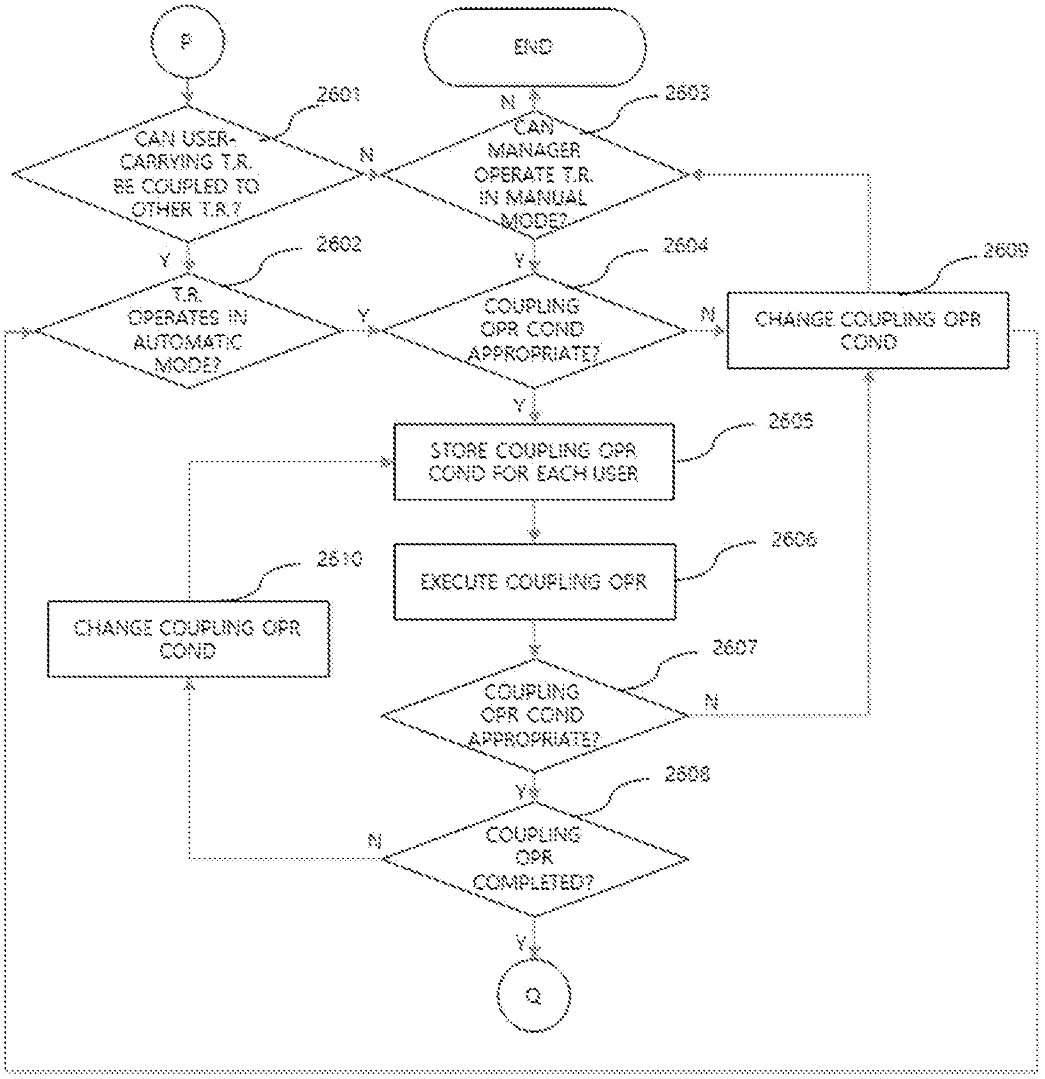
Figure 41:
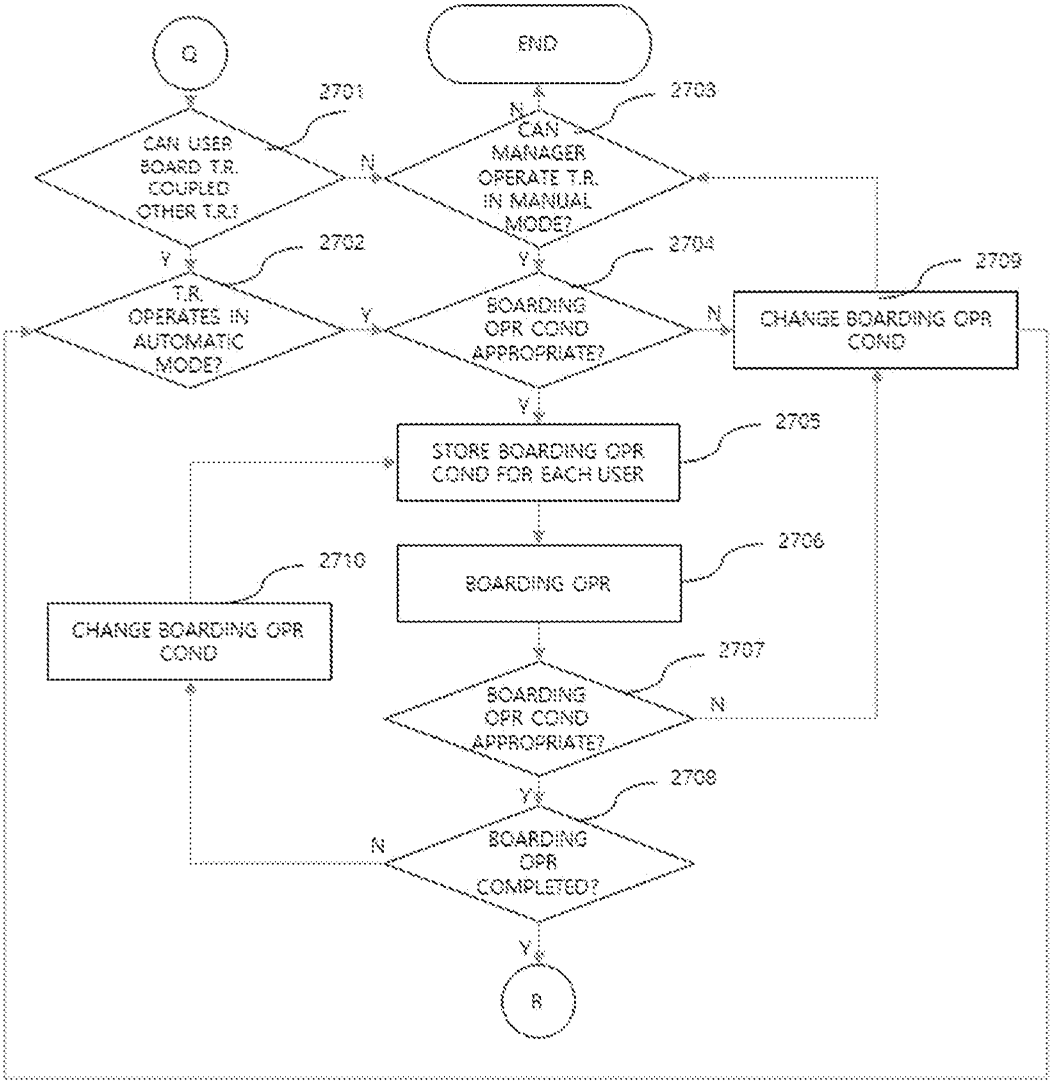
Figure 42:
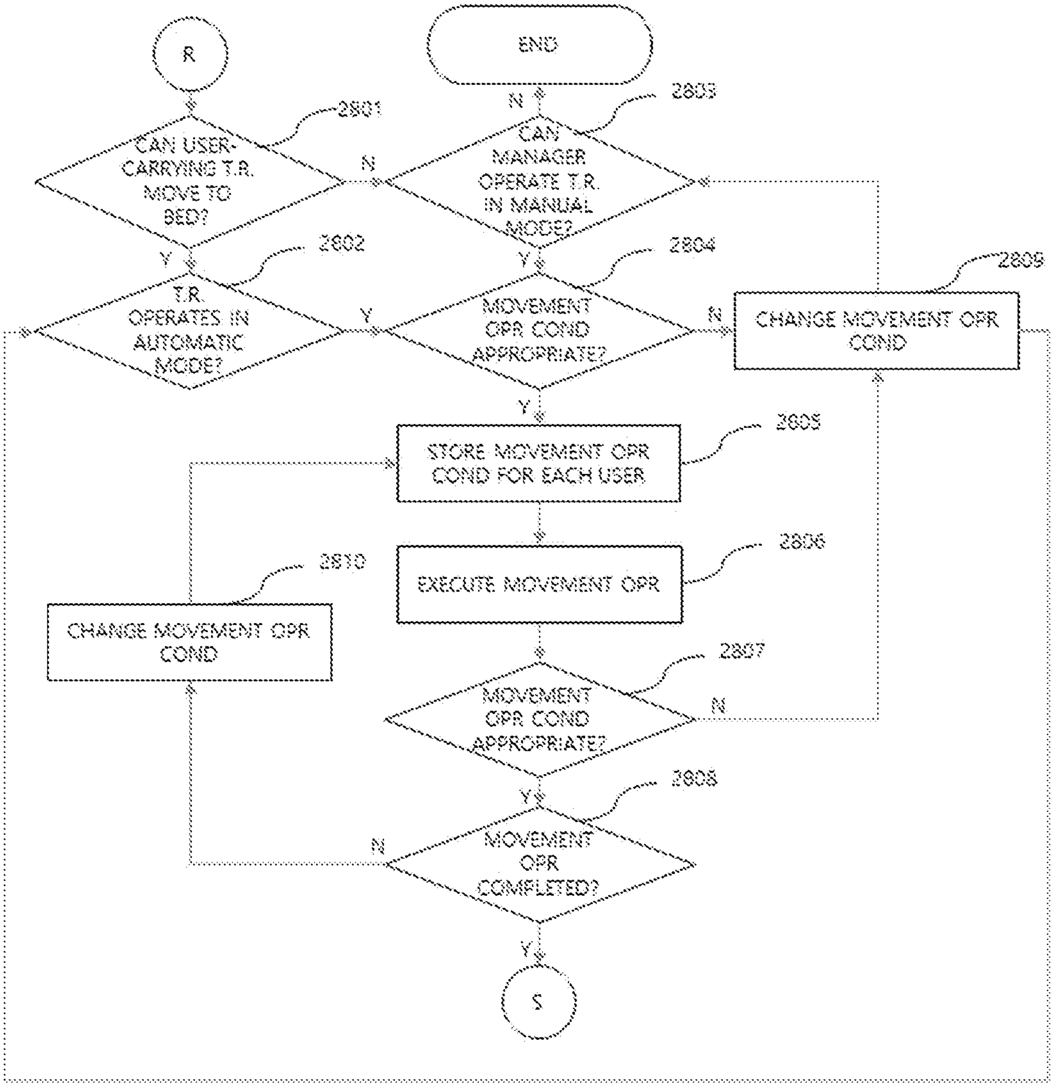
Figure 43:
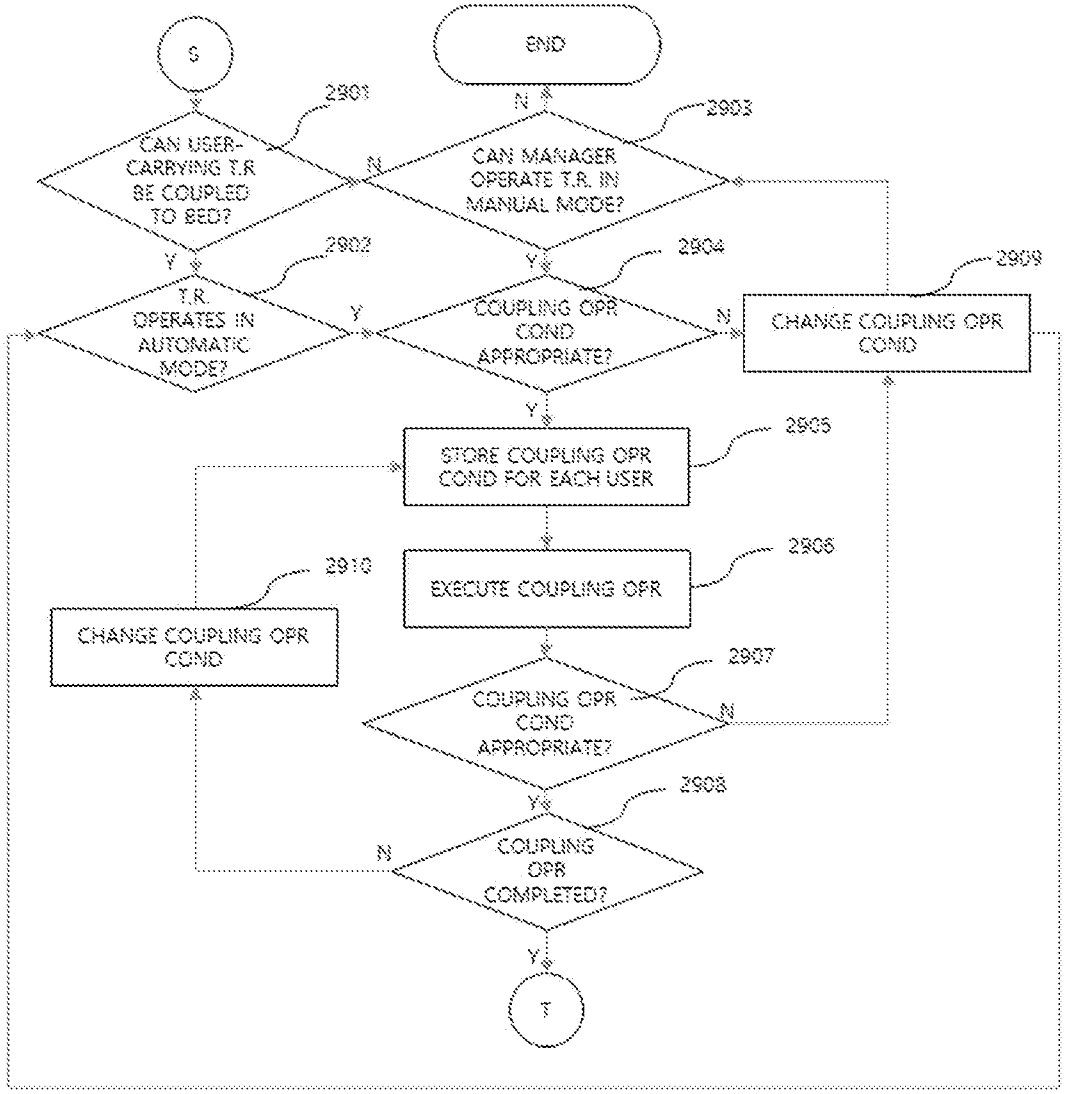
Figure 44:
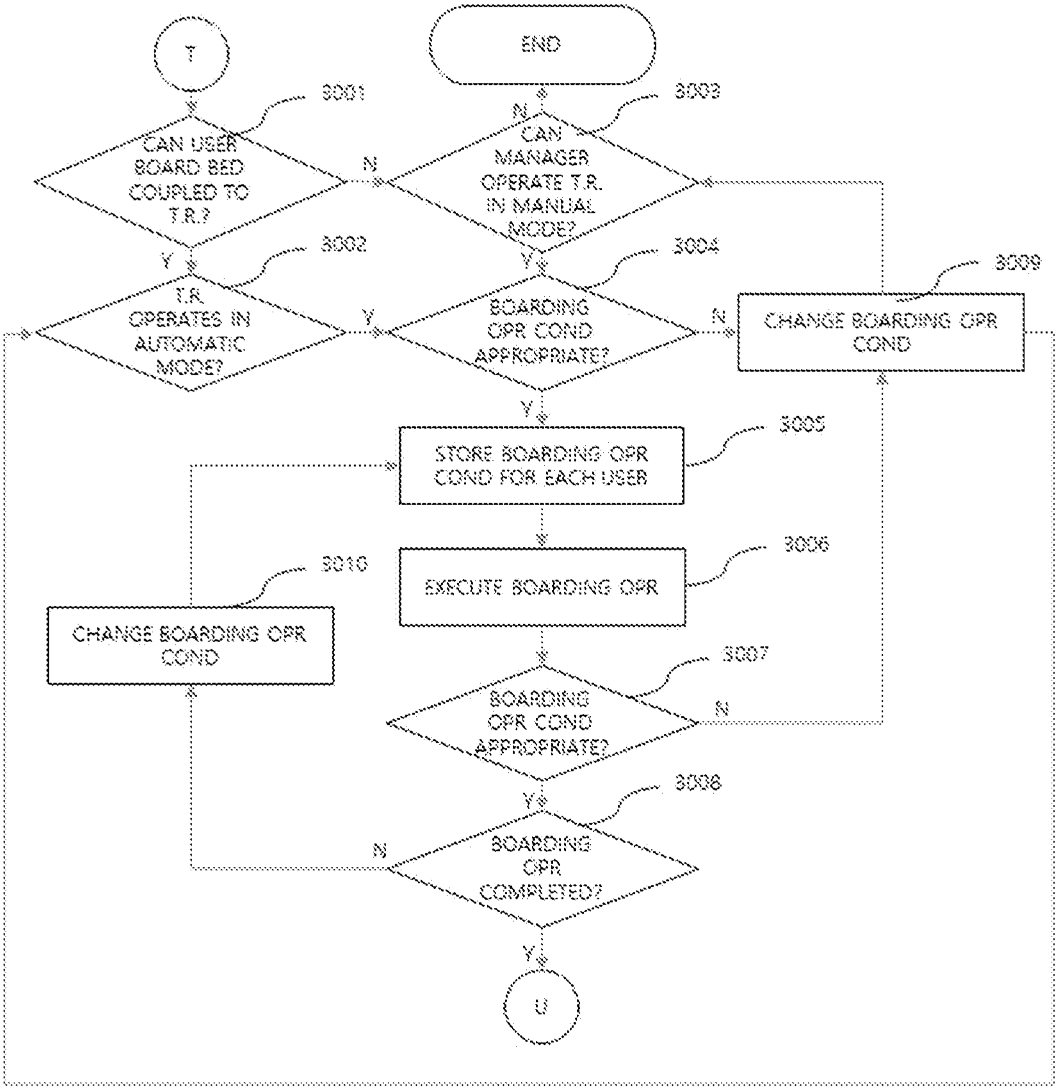
Figure 45:
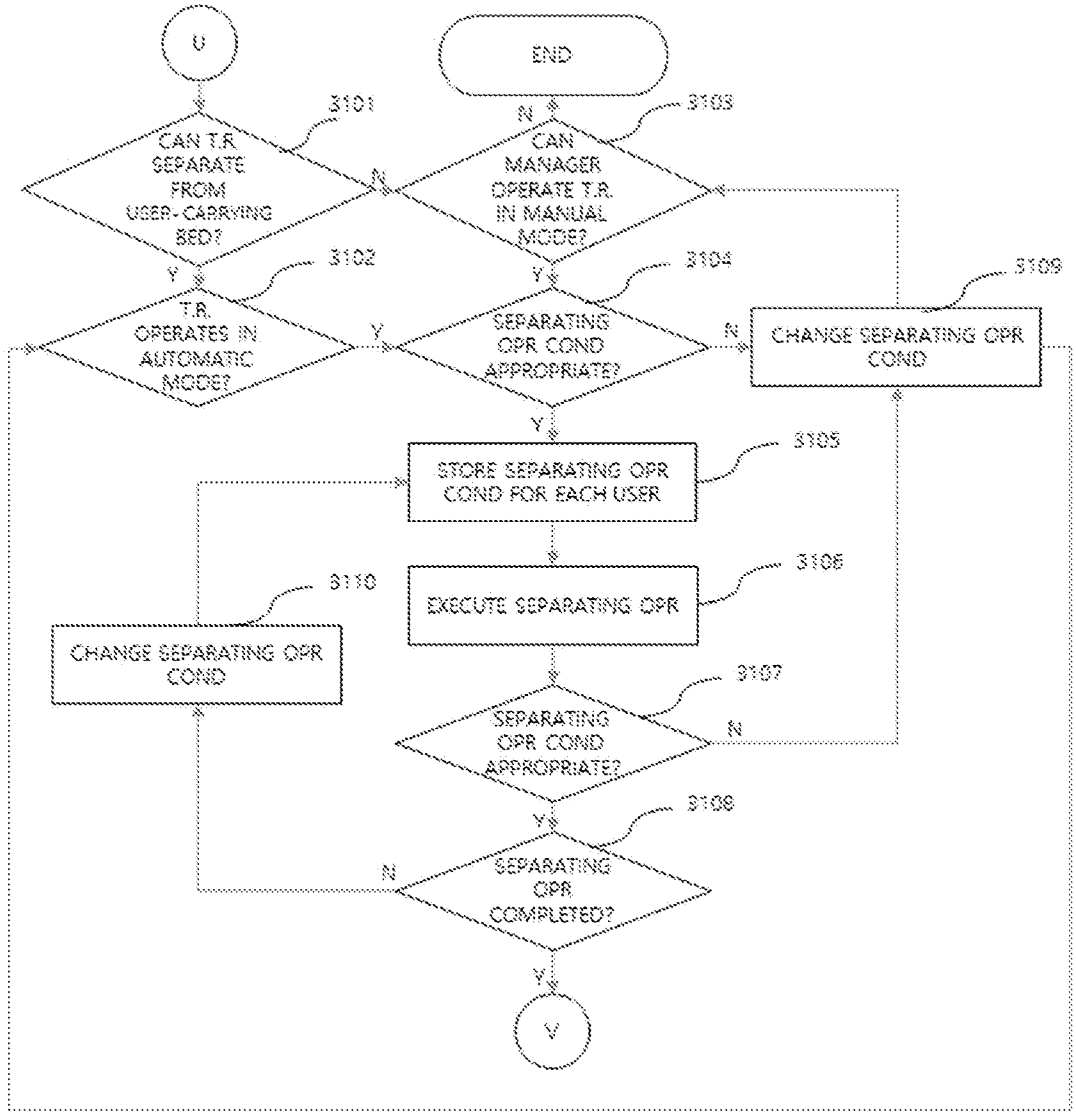
Figure 46:
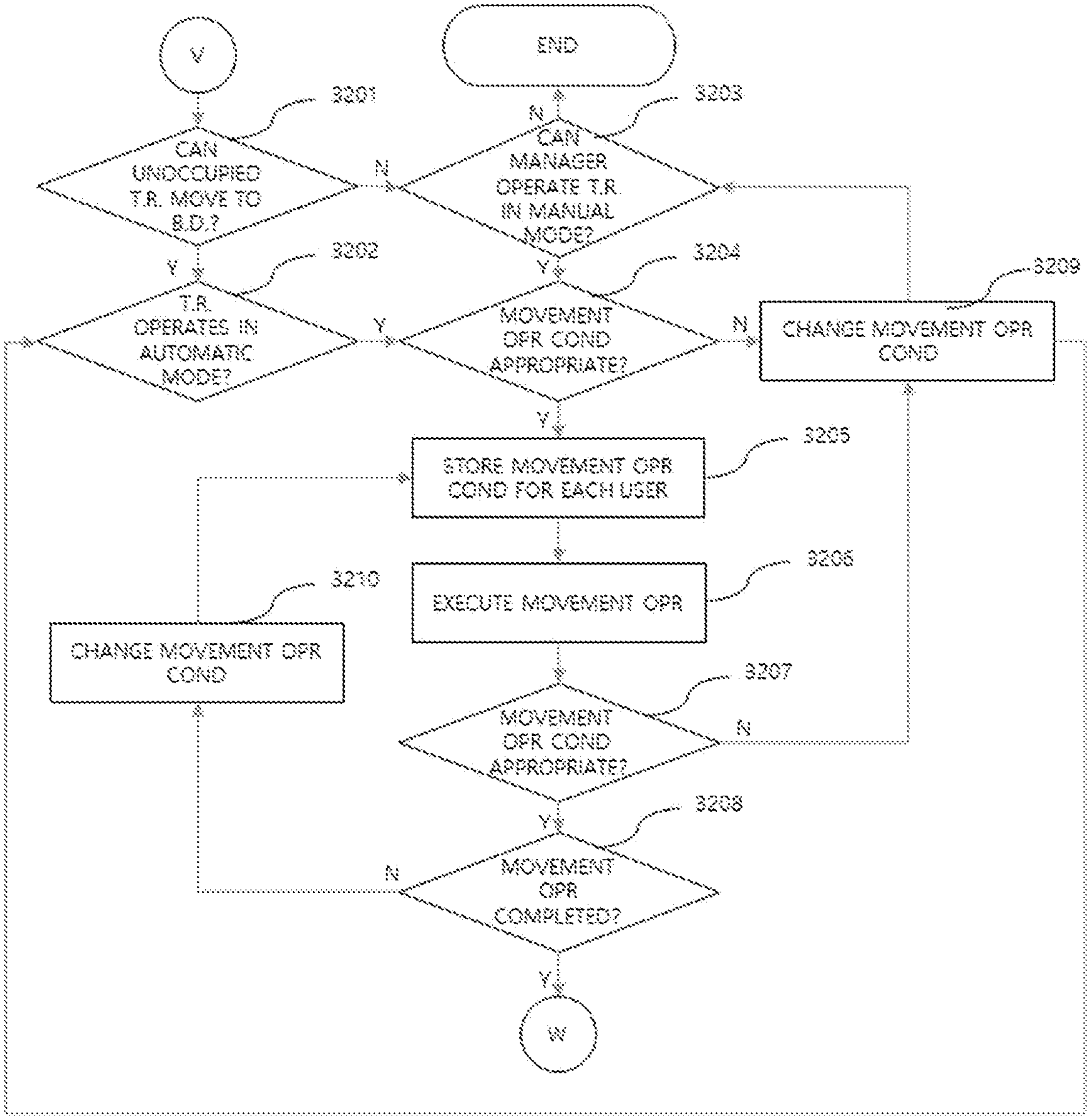
Figure 47:
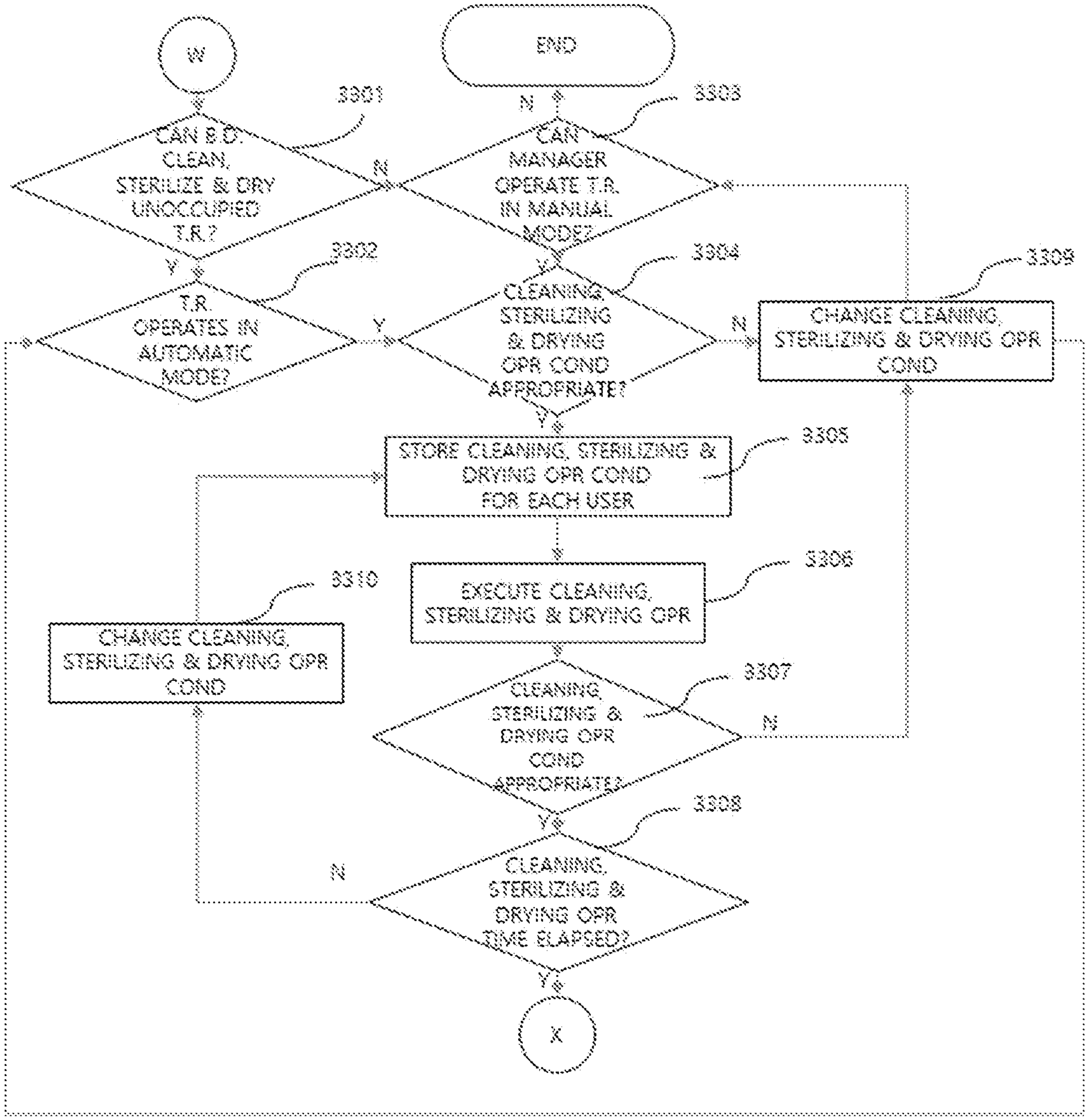
Figure 48:
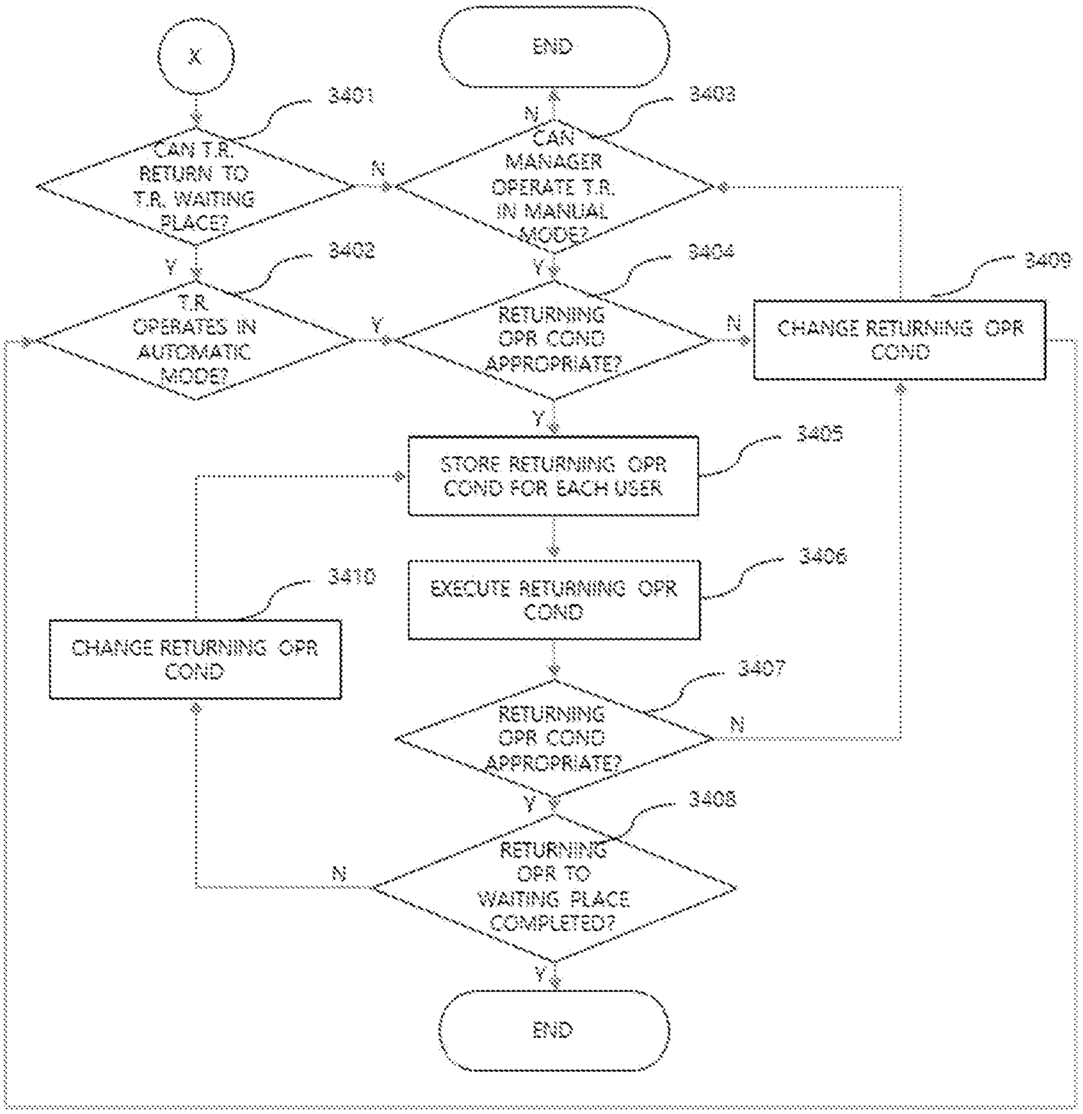
Figure 49:
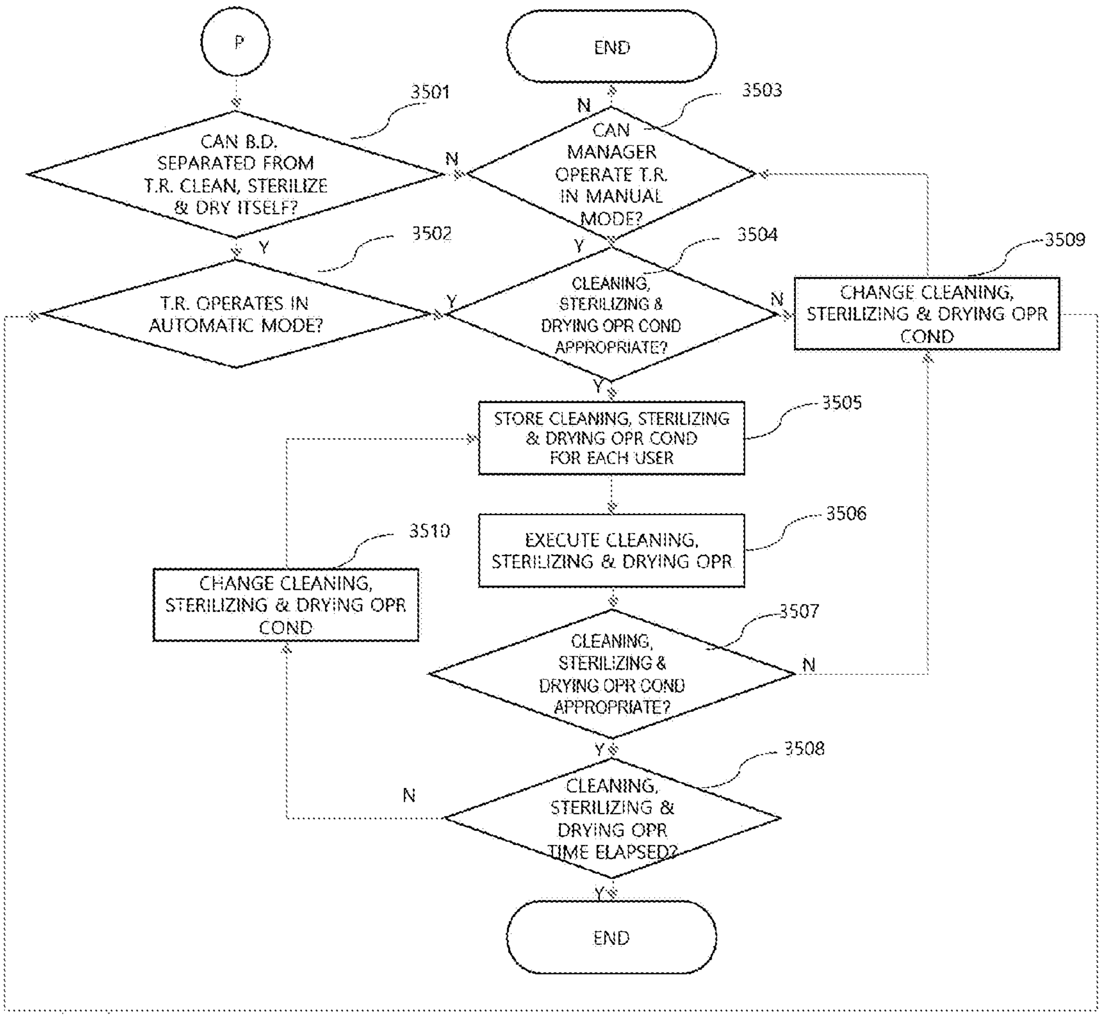
Figure 50:
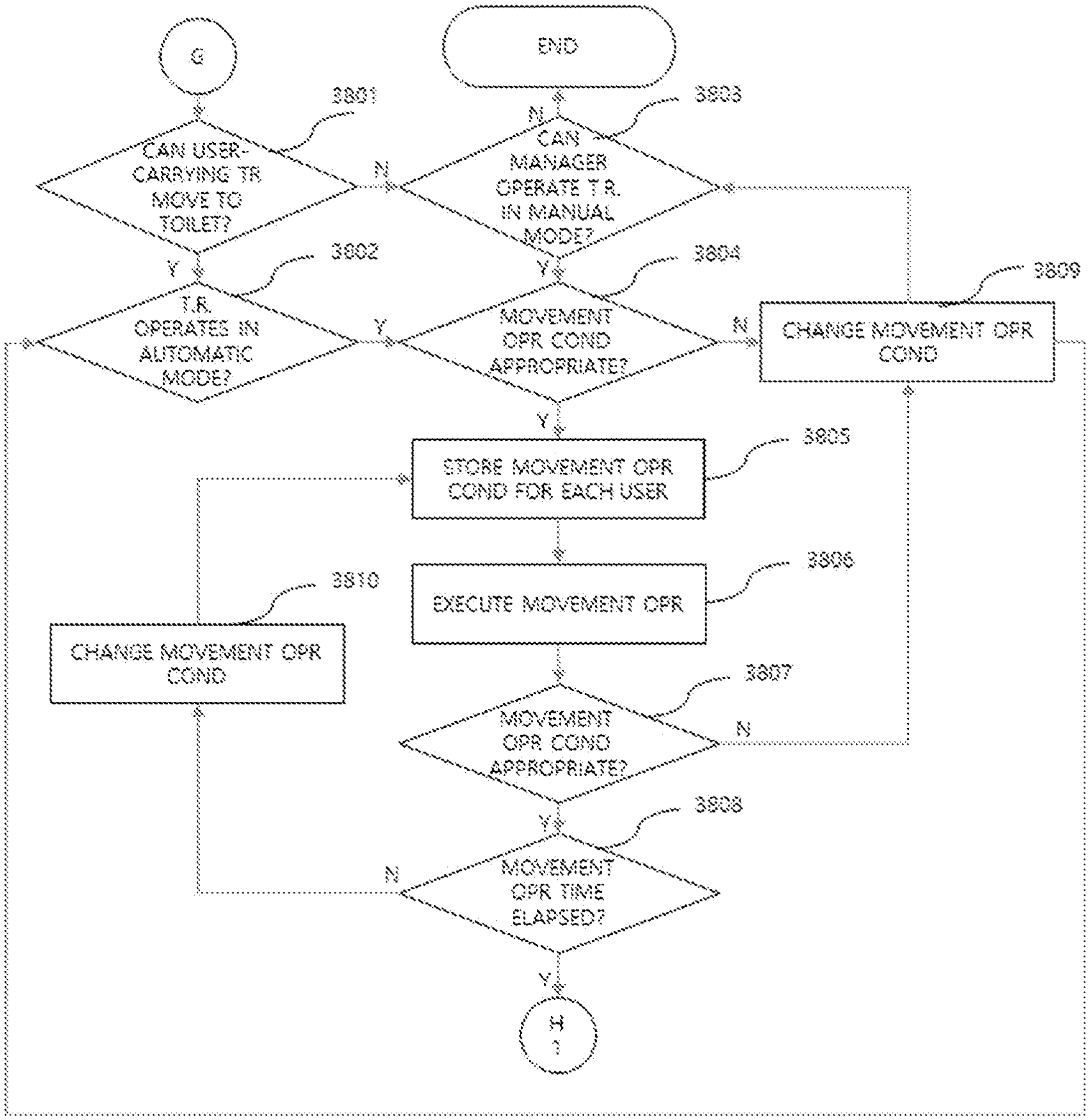
Figure 51:
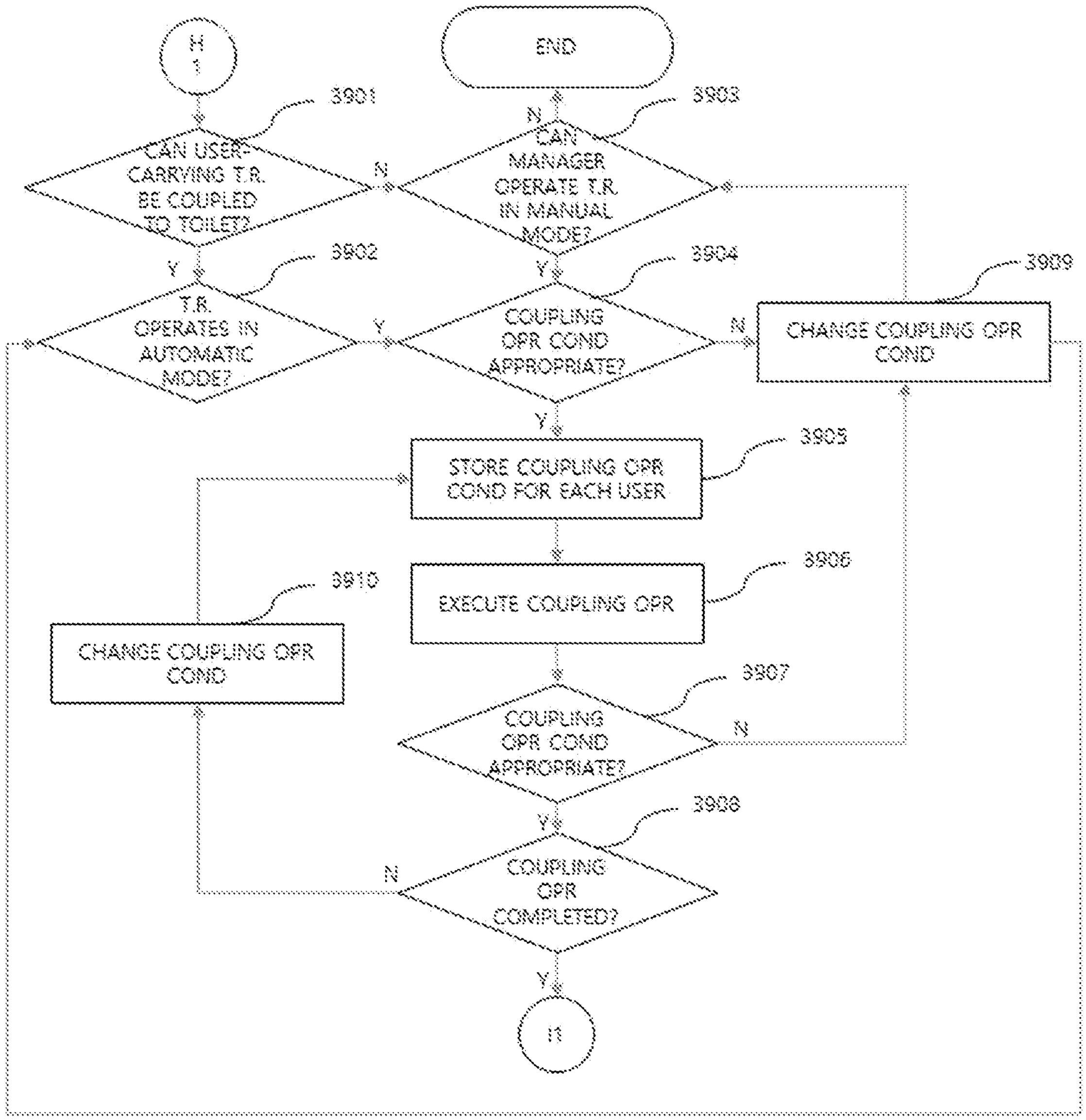
Figure 52:
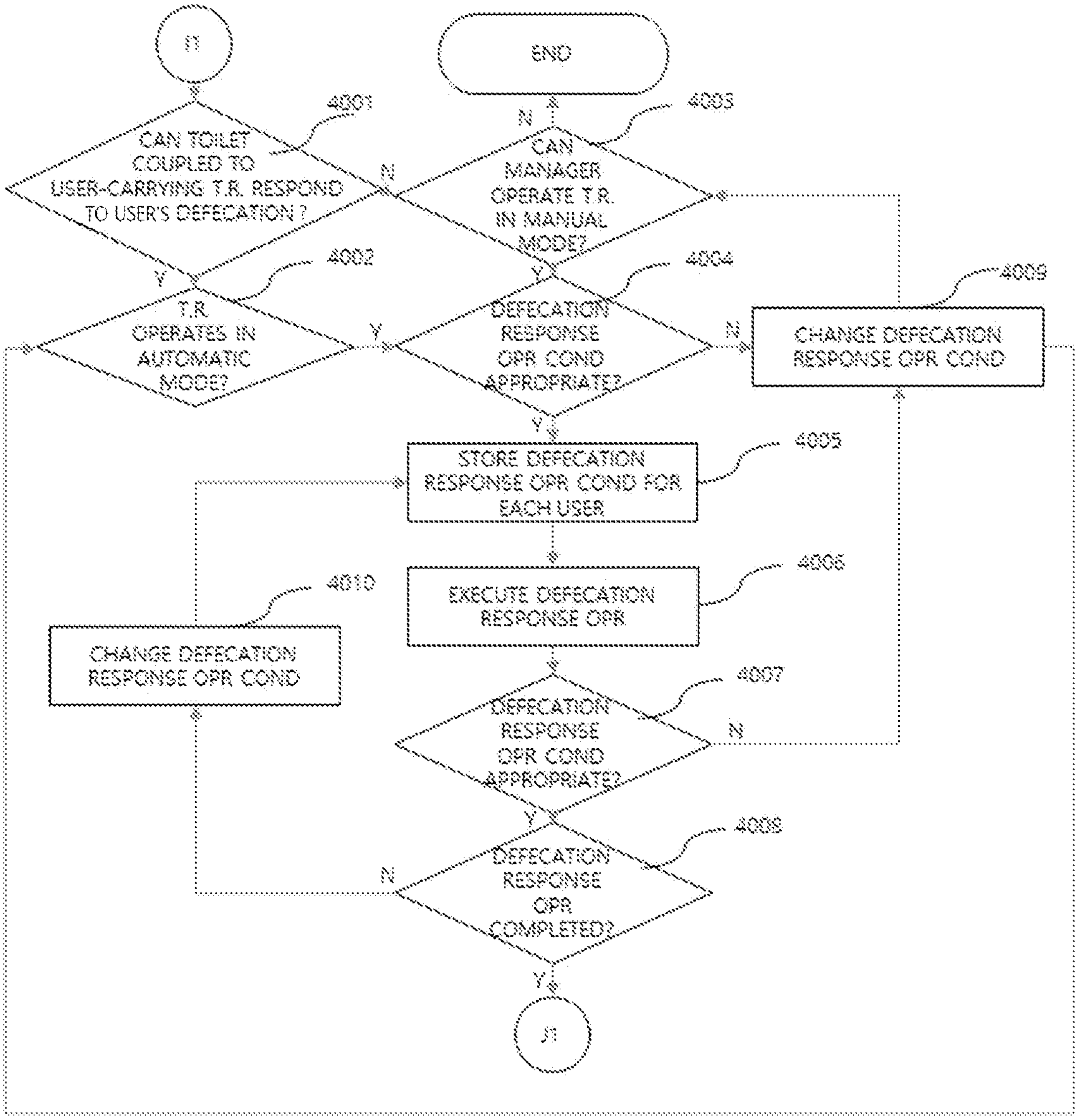
Figure 53:
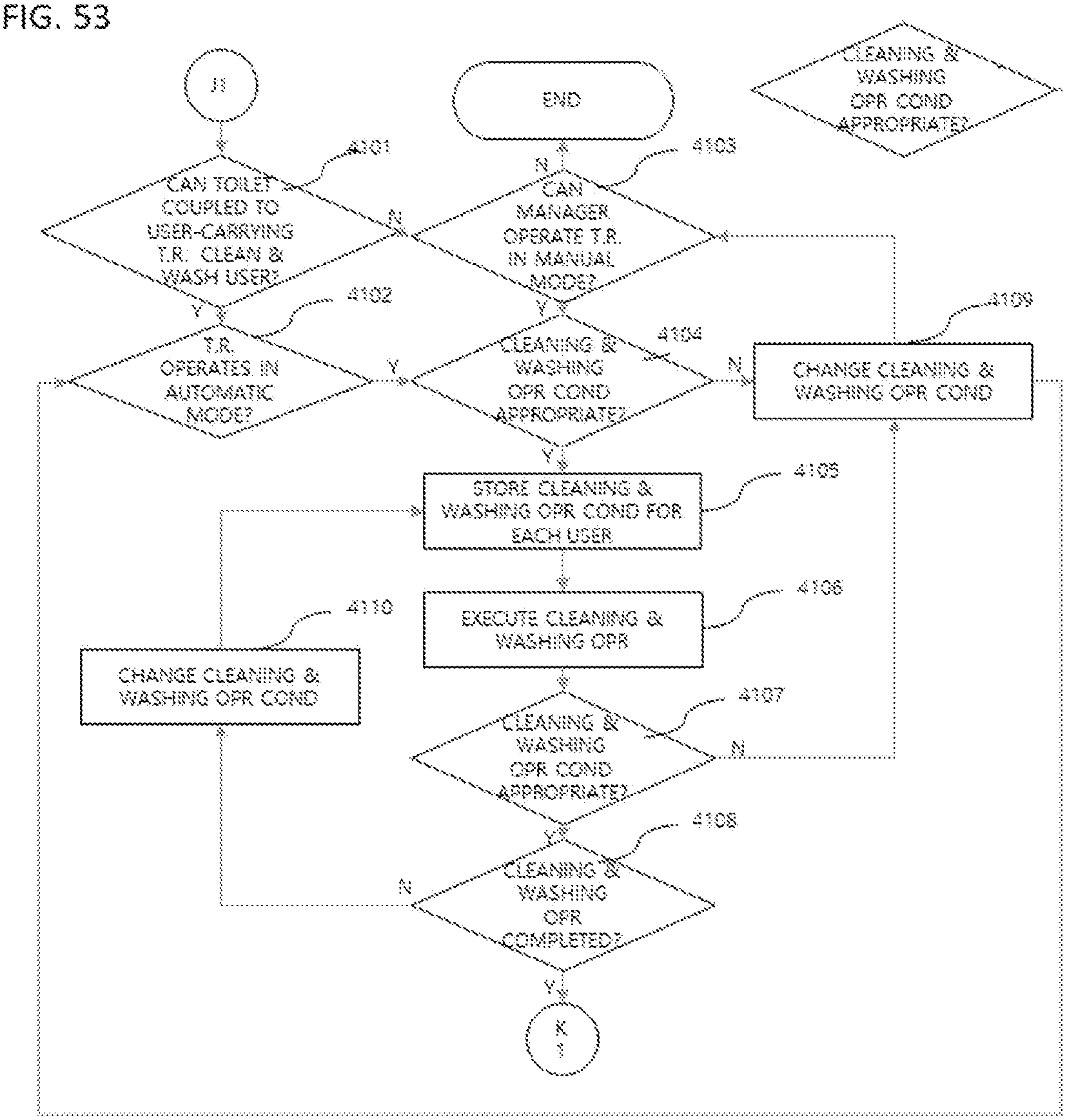
Figure 54:
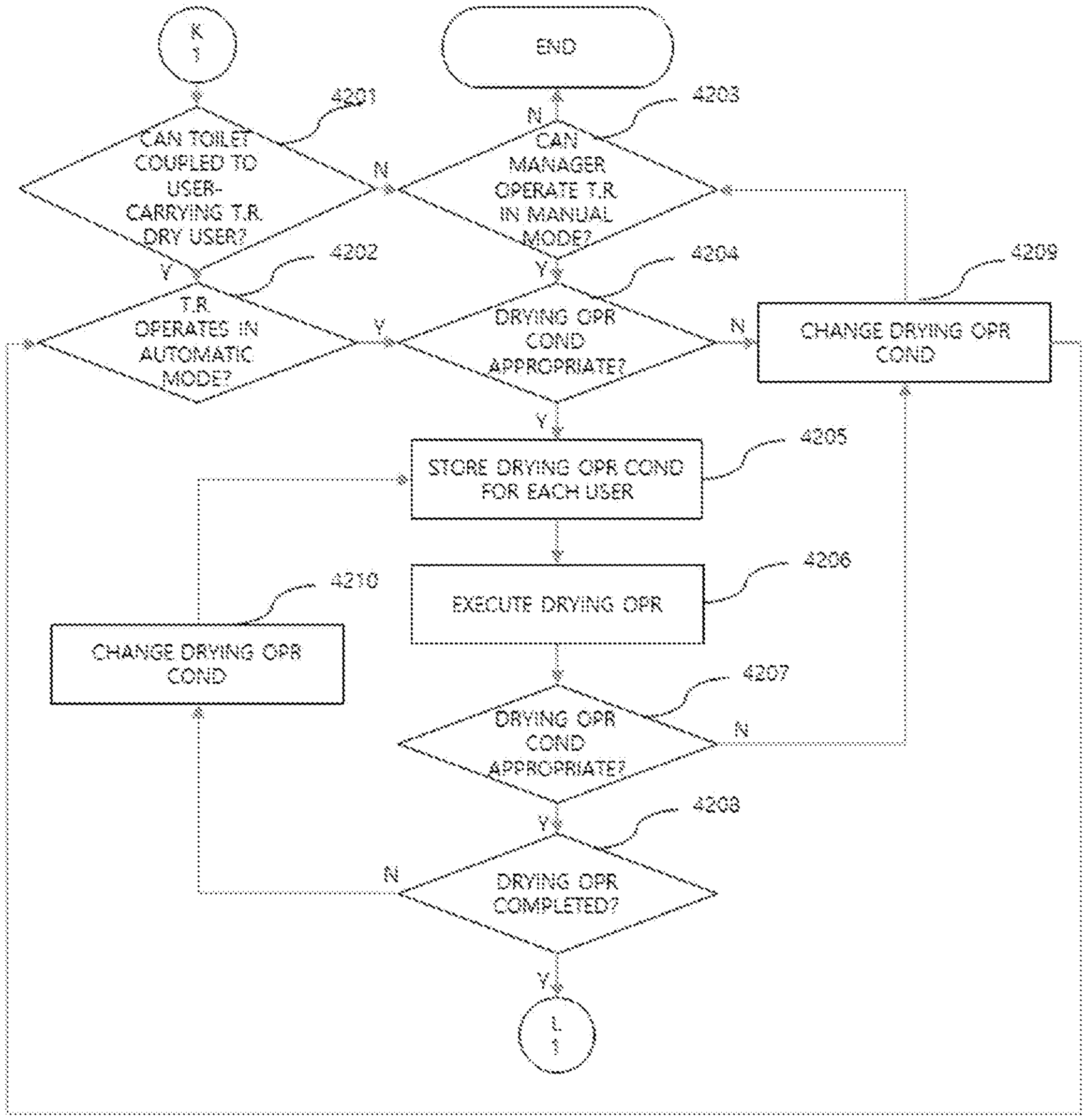
Figure 55:
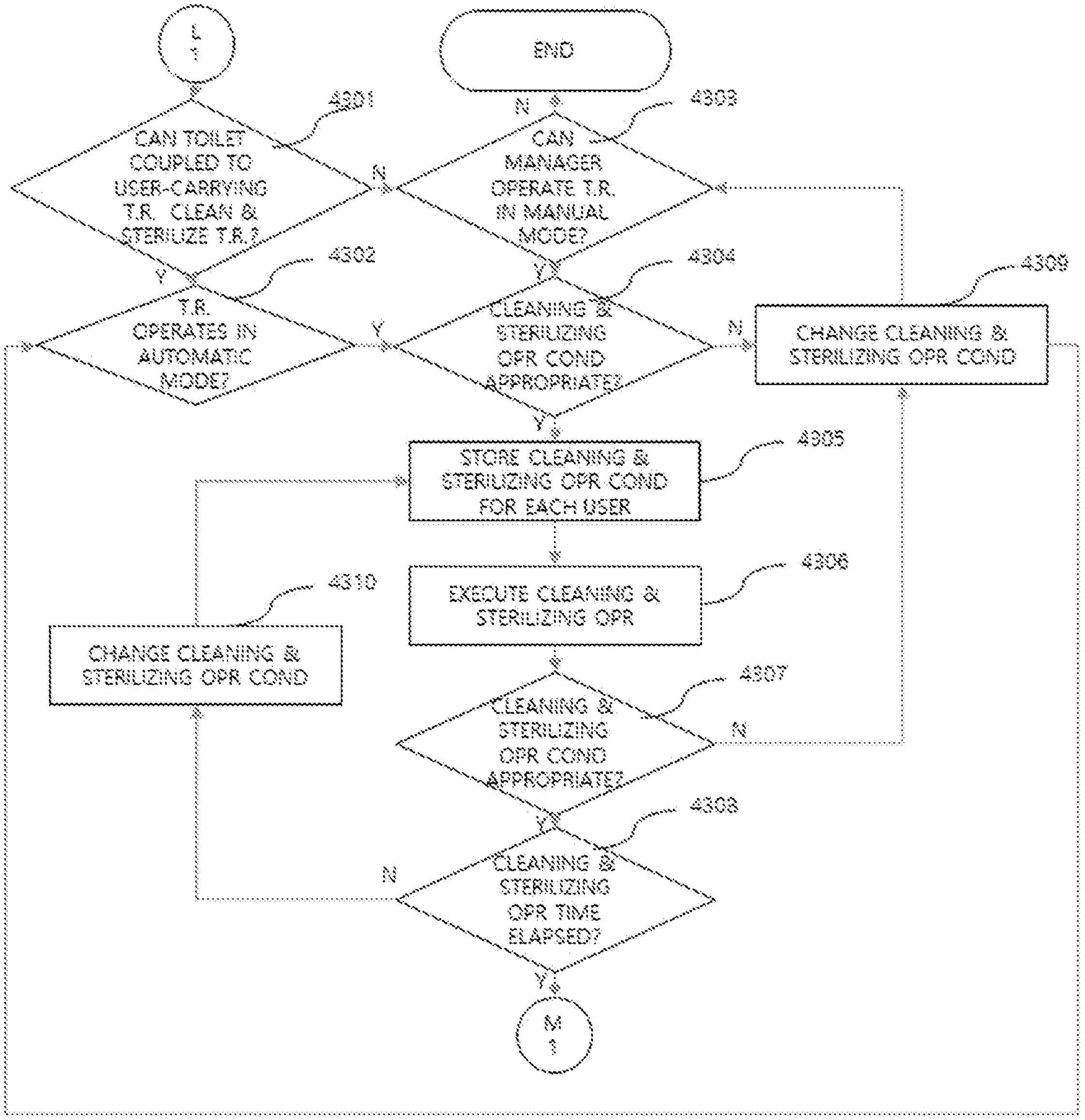
Figure 56:
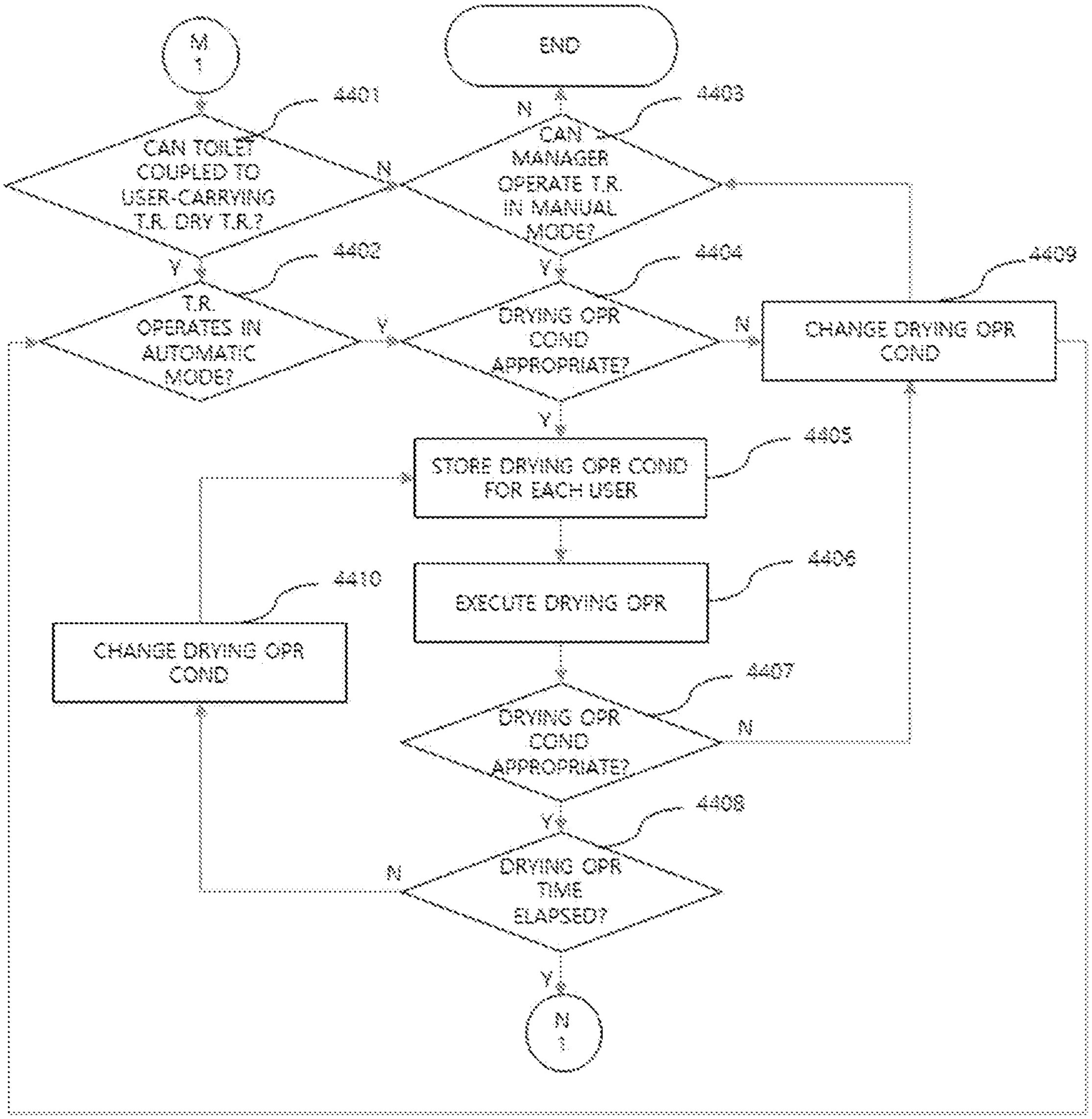
Figure 57:
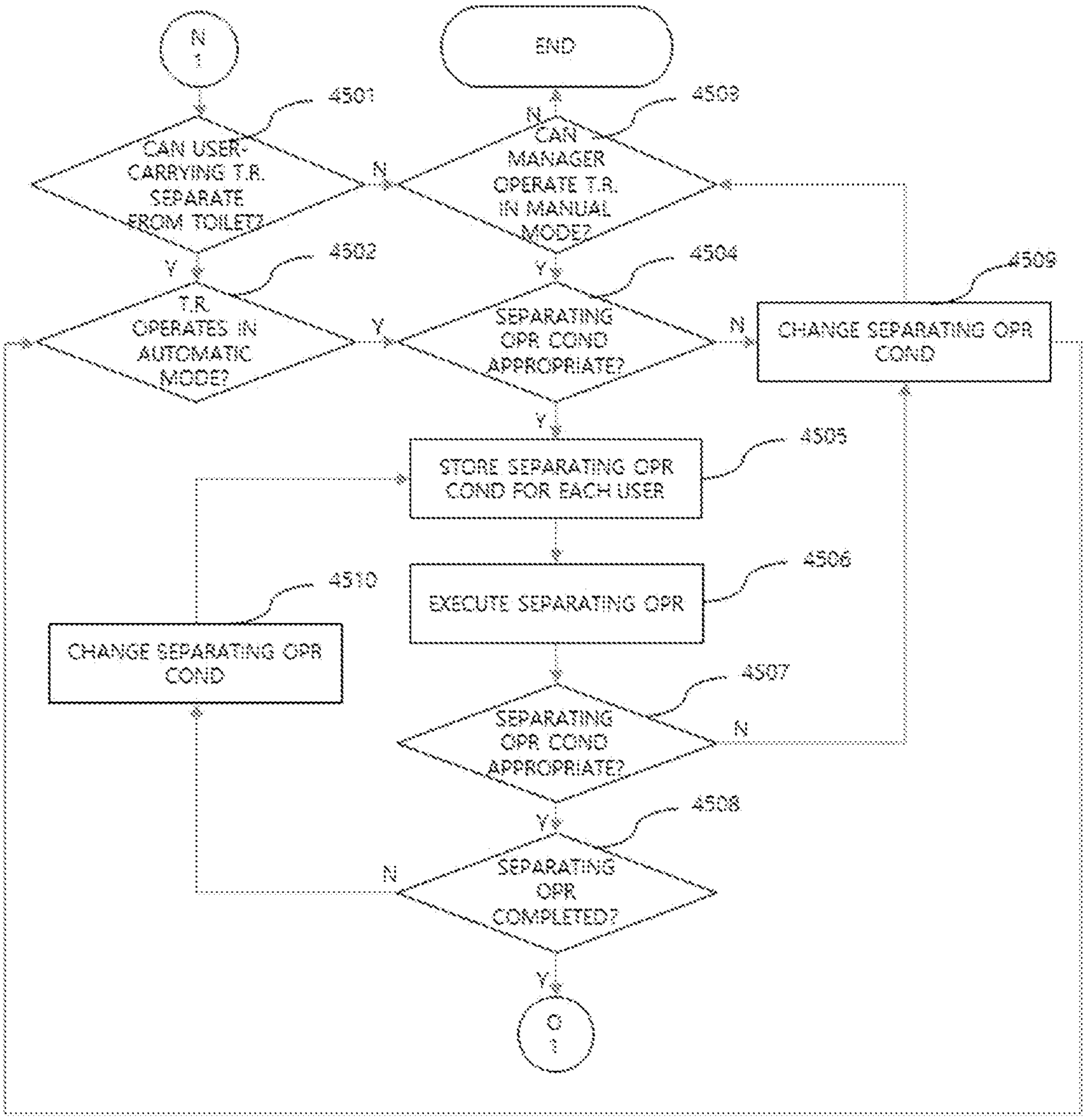
Figure 58:
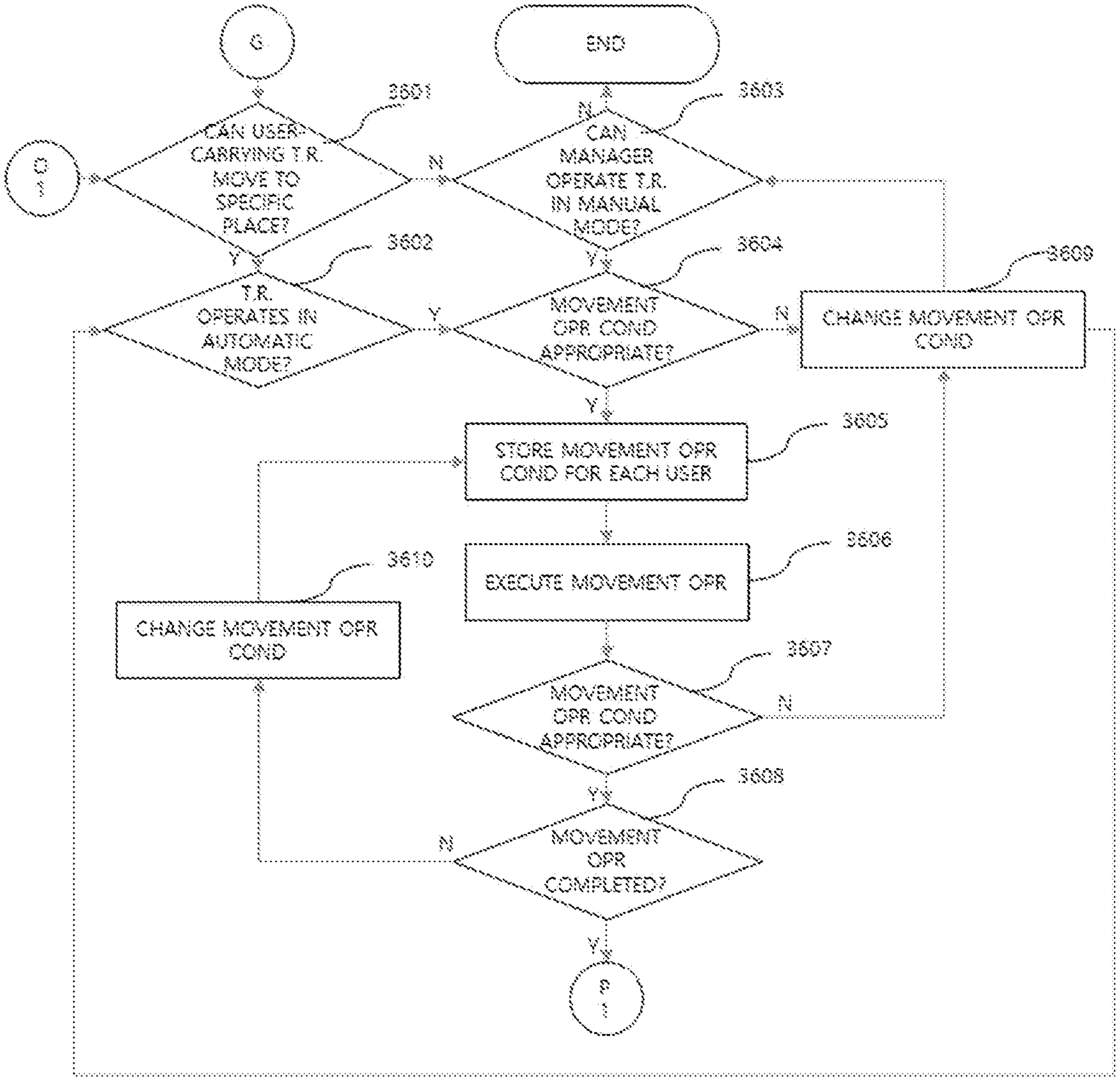
Figure 59:
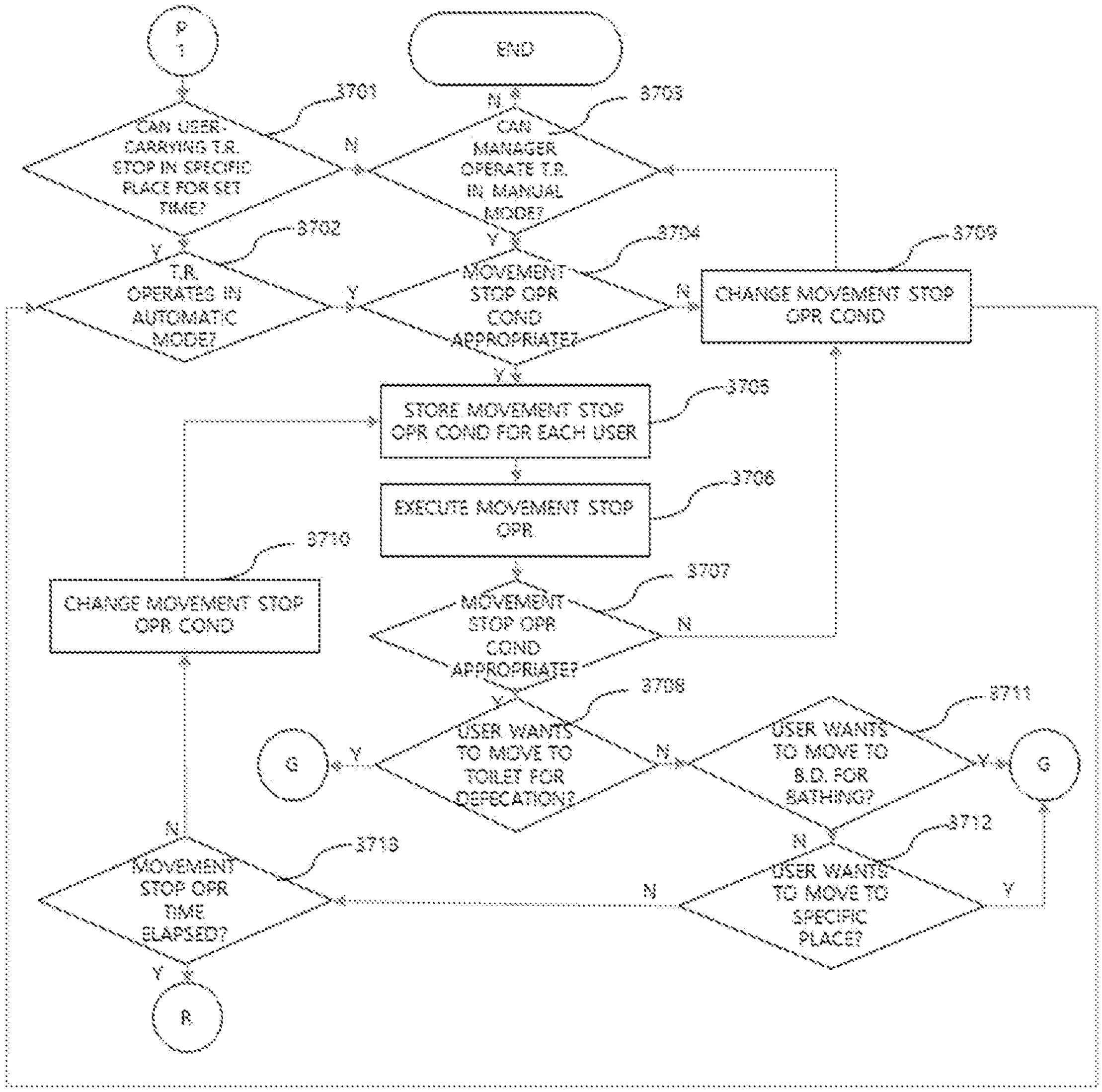

A transfer robot of the present invention can operate fully autonomously using artificial intelligence and automatic control technology. From the viewpoint of such an autonomous execution robot, the function and control of the transfer robot of the present invention are described through a software program with reference to drawings subsequent to FIG. 26. FIG. 26 is a schematic diagram of a software program to be included in the transfer robot. FIGS. 27 to 59 illustrate detailed routines for each processing procedure in an outline of the program of FIG. 26. A routine in which the transfer robot of the present invention interacts with other external environments or apparatuses, for example, other transfer robots, beds, toilets, and bathing devices, to perform autonomous functions is described. Communication with the external environment and autonomous function performance of the transfer robot of the present invention described above can be easily implemented by those skilled in the art with reference to flowcharts of the software program of FIGS. 26 to 59.

The function or process of each component of the transfer robot according to the present invention can be implemented with a hardware element including at least one of a digital signal processor (DSP), a processor, a controller, an application-specific integrated circuit (ASIC), a programmable logic device (FPGA or the like), and other electronic devices, and a combination thereof. In addition, the function or process of each component of the transfer robot can be implemented with software combined with hardware elements or independently, and the software can be stored in a recording medium.

Although the present invention has been described with reference to exemplary embodiments of the present invention, it will be understood by those skilled in the art to which the present invention pertains that the present invention can be carried out in specific forms other than those disclosed herein without changing the technical spirit and essential features thereof. Therefore, it should be understood that the embodiments described herein are illustrative and not restrictive in all aspects. The scope of the present invention is defined by the scope of the attached claims, rather than the detailed description. It should be appreciated that all variations and modifications derived from the scope of the claims and the equivalent concepts thereof are included in the scope of the present invention.

The invention claimed is:

1. A multi-functional robot apparatus comprising:

an upper plate formed by connecting one or more divided upper plates in a longitudinal direction;

a porous flexible sheet which is included in each divided upper plate of the upper plate and reciprocates in a lateral direction, each section of the porous flexible sheet spaced apart from each other section in the longitudinal direction by a portion of one of the one or more divided upper plates, wherein the porous flexible sheet reciprocates in a lateral direction, on an upper surface of one of the one or more divided upper plates, both in a first direction from one side of the one or more divided upper plates to an opposite side of the one or more divided upper plates and in a second direction opposite to the first direction;

a first roller that wraps and rotates one end of the porous flexible sheet to allow the porous flexible sheet to move in the first direction;

a second roller that wraps and rotates the other end of the porous flexible sheet to allow the porous flexible sheet to move in the second direction;

a pivot mechanism included between the divided upper plates such that each divided upper plate independently pivots vertically; and at least one hydraulic cylinder configured to adjust a height, a lateral tilt, and a longitudinal tilt of at least one of the divided upper plates.

2. The multi-functional transfer robot apparatus of claim 1, wherein an opening/closing port for defecation is included in one of the divided upper plates.

3. The multi-functional transfer robot apparatus of claim 1, further comprising a wheel frame positioned under the upper plate to support a wheel, wherein the wheel frame moves the wheel in the longitudinal direction through a telescopic mechanism.

4. The multi-functional transfer robot apparatus of claim 1, further comprising a safety handrail which is installed to face a lateral side of the upper plate and moves vertically.

5. The multi-functional transfer robot apparatus of claim 1, further comprising a control unit configured to perform an object shift mode, an object transferring mode, a defecation assistance mode, and a bathing assistance mode.

6. The multi-functional transfer robot apparatus of claim 1, further comprising:

a part configured to communicate with an external environment; and an autonomous execution unit configured to autonomously perform an object shift mode, an object transferring mode, a defecation assistance mode, and a bathing assistance mode.

7. The multi-functional transfer robot apparatus of claim 1, further comprising a control unit configured to autonomously search for at least one of a bed, a toilet, and a bathing device to move to.

8. The multi-functional transfer robot apparatus of claim 1, further comprising: a waterproof membrane frame positioned around the upper plate and vertically erected upward from the upper plate; and a waterproof membrane attached to the waterproof membrane frame and configured to function as a bathtub by blocking a periphery of the upper plate.

9. The multi-functional transfer robot apparatus of claim 1, further comprising:

a first pipe connected to a water supply facility to receive water and air; and a second pipe connected to a sewage facility to discharge wastewater.

10. The multi-functional transfer robot apparatus of claim 1, wherein at least one of the divided upper plates of the upper plate includes:

a first nozzle configured to spray water; and a second nozzle configured to spray air.

* * * * *